US012663735B2

(12) United States Patent
Tsurumi et al.

(10) Patent No.: US 12,663,735 B2
(45) Date of Patent: Jun. 23, 2026

(54) ELECTROSTATIC CHARGE IMAGE DEVELOPER, DEVELOPER CARTRIDGE, PROCESS CARTRIDGE, IMAGE FORMING APPARATUS, AND IMAGE FORMING METHOD

(71) Applicant: FUJIFILM Business Innovation Corp., Tokyo (JP)

(72) Inventors: Yosuke Tsurumi, Kanagawa (JP); Yasuo Kadokura, Kanagawa (JP); Moegi Iguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 456 days.

(21) Appl. No.: 18/453,339

(22) Filed: Aug. 22, 2023

(65) Prior Publication Data

US 2024/0319630 A1 Sep. 26, 2024

(30) Foreign Application Priority Data

Mar. 20, 2023 (JP) ................................ 2023-043886

(51) Int. Cl.
*G03G 9/087* (2006.01)
*G03G 9/08* (2006.01)
(Continued)

(52) U.S. Cl.
CPC ......... *G03G 9/1133* (2013.01); *G03G 9/0825* (2013.01); *G03G 9/1085* (2020.08)

(58) Field of Classification Search
CPC ............. G03G 9/0821; G03G 9/08711; G03G 9/08755
See application file for complete search history.

(56) References Cited

U.S. PATENT DOCUMENTS 8,741,523 B2 6/2014 Hori et al.
8,749,856 B2 6/2014 Osakabe
(Continued)

FOREIGN PATENT DOCUMENTS

JP 2004-333968 * 11/2004 ............... G03G 9/08
JP 2007065079 3/2007
(Continued)

OTHER PUBLICATIONS

Translation of JP 2007-333886.*
(Continued)

*Primary Examiner* — Peter L Vajda
(74) *Attorney, Agent, or Firm* — JCIPRNET

(57) ABSTRACT

An electrostatic charge image developer contains a toner including toner particles that contain a binder resin and a carrier including magnetic particles and a resin layer that adheres to a surface of the magnetic particles, in which, in a dynamic viscoelasticity measurement of the toner, in a case where a loss tangent tanδ at a temperature of 90° C. and a strain of 1% is represented by D1 (90), a loss tangent tanδ at a temperature of 90° C. and a strain of 50% is represented by D50 (90), a loss tangent tanδ at a temperature of 150° C. and a strain of 1% is represented by D1 (150), and a loss tangent tanδ at a temperature of 150° C. and a strain of 50% is represented by D50 (150), each of D1 (90), D50 (90), D1 (150), and D50 (150) is 0.5 or more and 2.5 or less, a value of D50 (150)−D1 (150) is less than 1.5, and a value of D50 (90)−D1 (90) is less than 1.0, and in the surface of the magnetic particles, an average unevenness interval Sm and an arithmetic mean roughness Ra satisfy 0.5 μm≤ Sm≤2.5 μm and 0.3 μm≤ Ra≤1.2 μm.

22 Claims, 2 Drawing Sheets

(51) Int. Cl.

| | |
|---|---|
| ***G03G 9/107*** | (2006.01) |
| ***G03G 9/113*** | (2006.01) |

(56) References Cited

U.S. PATENT DOCUMENTS

| | | | | |
|---|---|---|---|---|
| 8,771,915 | B2 | 7/2014 | Ueda et al. | |
| 10,698,328 | B2 | 6/2020 | Kawamura et al. | |
| 2013/0224642 | A1 | 8/2013 | Pang et al. | |
| 2014/0255840 | A1* | 9/2014 | Sekiguchi | G03G 9/081 430/105 |
| 2016/0282742 | A1* | 9/2016 | Uchino | G03G 9/0819 |

FOREIGN PATENT DOCUMENTS

| | | | | |
|---|---|---|---|---|
| JP | 2007-333886 | * | 12/2007 | G03G 9/107 |
| JP | 2011237792 | | 11/2011 | |
| JP | 2011237793 | | 11/2011 | |
| JP | 2013016886 | | 1/2013 | |
| JP | 2017-044864 | * | 3/2017 | G03G 9/08 |
| JP | 2018205643 | | 12/2018 | |
| JP | 2019144368 | | 8/2019 | |
| JP | 2020042121 | | 3/2020 | |
| JP | 2020042122 | | 3/2020 | |
| JP | 2020106685 | | 7/2020 | |
| JP | 7135479 | | 9/2022 | |

OTHER PUBLICATIONS

Translation of JP 2004-333968.*
Translation of JP 2017-044864.*
"Search Report of Europe Counterpart Application", issued on Feb. 19, 2024, pp. 1-7.

* cited by examiner

ELECTROSTATIC CHARGE IMAGE DEVELOPER, DEVELOPER CARTRIDGE, PROCESS CARTRIDGE, IMAGE FORMING APPARATUS, AND IMAGE FORMING METHOD

CROSS-REFERENCE TO RELATED APPLICATIONS

This application is based on and claims priority under 35 USC 119 from Japanese Patent Application No. 2023-043886 filed Mar. 20, 2023.

BACKGROUND

(i) Technical Field

The present invention relates to an electrostatic charge image developer, a developer cartridge, a process cartridge, an image forming apparatus, and an image forming method.

(ii) Related Art

JP2020-042122A discloses a developer of an electrostatic latent image developing toner that contains toner particles containing a binder resin, in which the binder resin contains an amorphous resin and a crystalline resin, and in a case where strain dispersion of dynamic viscoelasticity is measured under the conditions of a temperature of 130° C., a frequency of 1 Hz, and a strain amplitude of 1.0% to 500%, and a stress integral value of a stress-strain curve at a strain amplitude of 100% is indicated as S130 and a slope of a major axis is indicated as θ130, the S130 is more than 0 Pa and 350,000 Pa or less, and the θ130 is more than 22° and less than 90°.

JP2020-106685A discloses a developer of an electrostatic charge image developing toner that contains at least a binder resin and a release agent, in which the binder resin contains at least a crystalline resin, and a storage elastic modulus measured at a frequency of 1 Hz, 150° C., and a strain varied in a range of 0.01% to 1000% satisfies a specific relationship.

JP2020-042121A discloses a developer of an electrostatic latent image developing toner that contains toner particles containing a binder resin, in which the binder resin contains an amorphous vinyl resin and a crystalline resin, and in a case where strain dispersion of dynamic viscoelasticity is measured under the conditions of a temperature of 130° C., a frequency of 1 Hz, and a strain amplitude of 1.0% to 500%, and a stress integral value of a stress-strain curve at a strain amplitude of 100% is indicated as S130 and a slope of a major axis is indicated as θ130, the S130 is more than 0 Pa and 350,000 Pa or less, and the θ130 is 0° or more and less than 10°.

JP2019-144368A discloses a developer of an electrostatic charge image developing toner that contains toner base particles containing at least a binder resin and a release agent, and an external additive, in which the binder resin contains a crystalline resin, and a peak top value tanδ6° C./min of a loss tangent of the electrostatic charge image developing toner measured under the conditions of a frequency of 1 Hz and a temperature rising rate of 6° C./min at a temperature raised to 100° C. from 25° C. and a peak top value tanδ3° C./min of a loss tangent of the electrostatic charge image developing toner measured under the conditions of a frequency of 1 Hz and a temperature rising rate of 3° C./min at a temperature raised to 100° C. from 25° C. satisfy a specific relationship.

JP2013-160886A discloses a developer of an electrostatic charge image developing toner that contains a binder resin, a colorant, and a release agent, in which a rate γG' of change in storage elastic modulus G' is 50%<γG'<86%, a rate γG' of change in loss elastic modulus G" is more than 50%, a storage elastic modulus G' in a range of 1% to 50% strain at a temperature of 150° C. is $5\times10^2$ to $3.5\times10^3$ Pa·s, and the binder resin includes a non-crystalline resin and a crystalline resin.

JP2011-237793A and JP2011-237792A disclose a developer of an electrostatic charge image developing toner consisting of toner particles that contain a binder resin, in which the binder resin is found to have a domain matrix structure consisting of a high elasticity resin configuring a domain and a low elasticity resin configuring a matrix in an elasticity image showing a cross section of the toner particles captured with an atomic force microscope (AFM), an arithmetic mean of a ratio of a major axis L of each domain to a minor axis W of each domain (L/W) is in a range of 1.5 to 5.0, a proportion of domains having the major axis L in a range of 60 to 500 nm is 80% by number or more, and a proportion of domains having the minor axis W in a range of 45 to 100 nm is 80% by number or more.

SUMMARY

In image formation using an electrostatic charge image developer containing a toner, for example, a toner image transferred to a recording medium is fixed to the recording medium by heating and pressing. In a case where an electrostatic charge image developer containing a toner that is easily melted by heating is used to obtain excellent fixability, a difference between glossiness of a fixed image fixed under a high-temperature and high-pressure condition and glossiness of a fixed image fixed under a low-temperature and low-pressure condition may be large. In addition, in a case where an electrostatic charge image developer containing a toner that is easily melted by heating is used, fog may occur in the image.

Aspects of non-limiting embodiments of the present disclosure relate to an electrostatic charge image developer, a developer cartridge, a process cartridge, an image forming apparatus, and an image forming method that provide an electrostatic charge image developer in which a difference in glossiness between a fixed image under a low-temperature and low-pressure condition and a fixed image under a high-temperature and high-pressure condition is smaller and fog of an image is further suppressed, as compared with a case where all of D1 (90), D50 (90), D1 (150), and D50 (150) are less than 0.5 or more than 2.5, a value of D50 (150)−D1 (150) is 1.5 or more, a value of D50 (90)−D1 (90) is 1.0 or more, an average unevenness interval Sm is less than 0.5 μm or more than 2.5 μm, or an arithmetic mean roughness Ra is less than 0.3 μm or more than 1.2 μm.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

The above-described object is achieved by the following aspect.

According to an aspect of the present disclosure, there is provided an electrostatic charge image developer including:

a toner including toner particles that contain a binder resin; and a carrier including magnetic particles and a resin layer that adheres to a surface of the magnetic particles, in which, in a dynamic viscoelasticity measurement of the toner, in a case where a loss tangent tanδ at a temperature of 90° C. and a strain of 1% is represented by D1 (90), a loss tangent tanδ at a temperature of 90° C. and a strain of 50% is represented by D50 (90), a loss tangent tanδ at a temperature of 150° C. and a strain of 1% is represented by D1 (150), and a loss tangent tanδ at a temperature of 150° C. and a strain of 50% is represented by D50 (150), each of D1 (90), D50 (90), D1 (150), and D50 (150) is 0.5 or more and 2.5 or less, a value of D50 (150)−D1 (150) is less than 1.5, and a value of D50 (90)−D1 (90) is less than 1.0, and in the surface of the magnetic particles, an average unevenness interval Sm and an arithmetic mean roughness Ra satisfy 0.5 μm≤ Sm≤2.5 μm and 0.3 μm≤ Ra≤1.2 μm.

BRIEF DESCRIPTION OF THE DRAWINGS

Exemplary embodiment(s) of the present invention will be described in detail based on the following figures, wherein.

DETAILED DESCRIPTION

Figure 1:
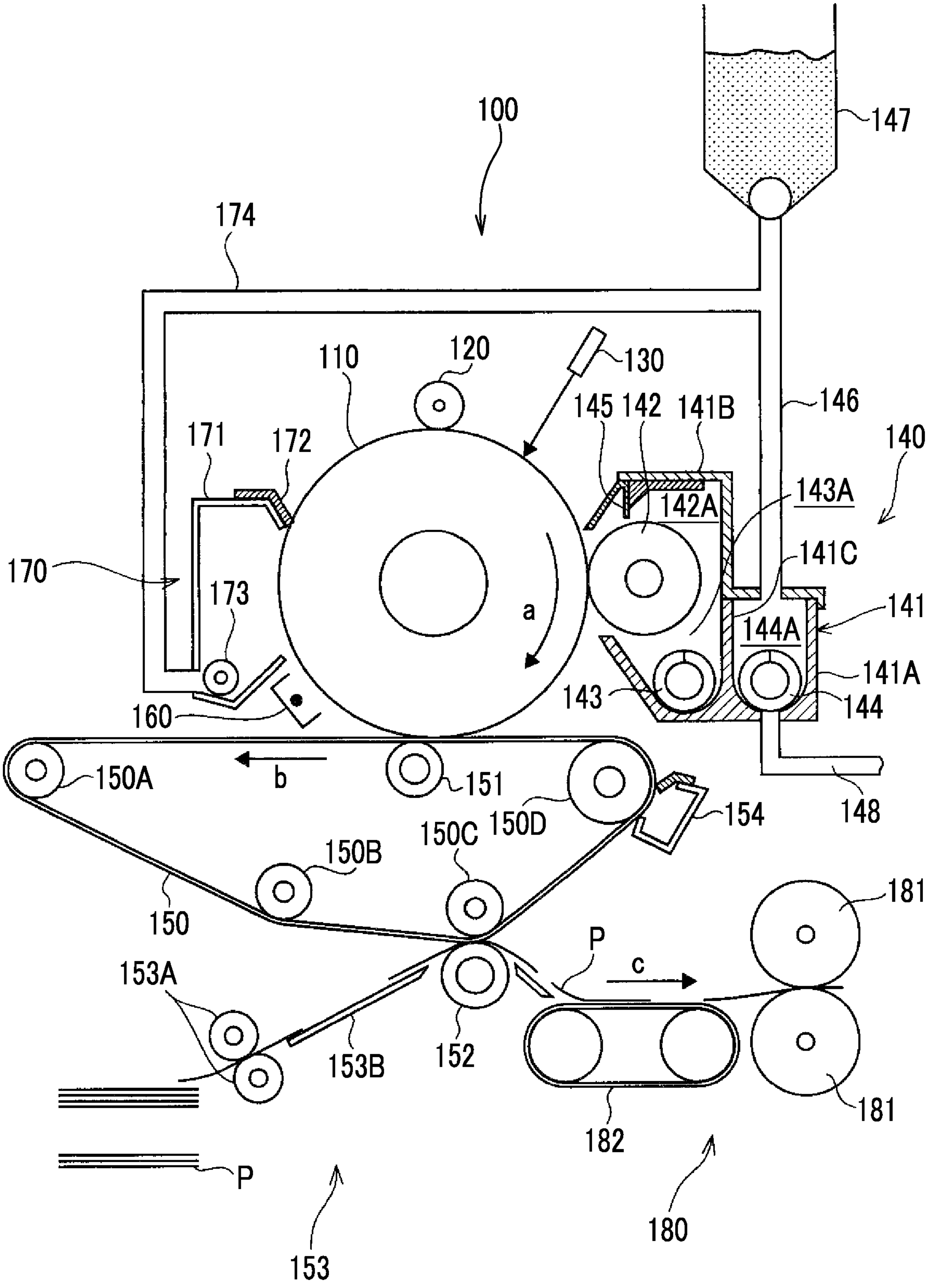
FIG. 1 is a view schematically showing a configuration of an example of an image forming apparatus according to the present exemplary embodiment.

The exemplary embodiments as an example of the present invention will be described below. The following descriptions and examples merely illustrate the exemplary embodiments, and do not limit the scope of the invention.

Regarding the numerical ranges described in stages in the present specification, the upper limit or lower limit of a numerical range may be replaced with the upper limit or lower limit of another numerical range described in stages. Furthermore, in the present specification, the upper limit or lower limit of a numerical range may be replaced with values described in examples.

In the present specification, (meth)acrylic means both acrylic and methacrylic.

In the present specification, the term "step" includes not only an independent step but a step that is not clearly distinguished from other steps as long as the intended purpose of the step is achieved.

Each component may include a plurality of corresponding substances.

In a case where the amount of each component in a composition is mentioned, and there are two or more kinds of substances corresponding to each component in the composition, unless otherwise specified, the amount of each component means the total amount of two or more kinds of the substances present in the composition.

Electrostatic Charge Image Developer

The electrostatic charge image developer (hereinafter, also referred to as "developer") according to the present exemplary embodiment contains a toner including toner particles that contain a binder resin and a carrier including magnetic particles and a resin layer that adheres to a surface of the magnetic particles, in which, in a dynamic viscoelasticity measurement of the toner, in a case where a loss tangent tanδ at a temperature of 90° C. and a strain of 1% is represented by D1 (90), a loss tangent tanδ at a temperature of 90° C. and a strain of 50% is represented by D50 (90), a loss tangent tanδ at a temperature of 150° C. and a strain of 1% is represented by D1 (150), and a loss tangent tanδ at a temperature of 150° C. and a strain of 50% is represented by D50 (150), each of D1 (90), D50 (90), D1 (150), and D50 (150) is 0.5 or more and 2.5 or less, a value of D50 (150)−D1 (150) is less than 1.5, and a value of D50 (90)−D1 (90) is less than 1.0, and in the surface of the magnetic particles, an average unevenness interval Sm and an arithmetic mean roughness Ra satisfy 0.5 μm≤ Sm≤2.5 μm and 0.3 μm≤ Ra≤1.2 μm.

Hereinafter, a toner in which each of D1 (90), D50 (90), D1 (150), and D50 (150) is 0.5 or more and 2.5 or less, a value of D50 (150)−D1 (150) is less than 1.5, and a value of D50 (90)−D1 (90) is less than 1.0 is referred to as "specific toner"; magnetic particles in which, in the surface, an average unevenness interval Sm and an arithmetic mean roughness Ra satisfy 0.5 μm≤ Sm≤2.5 μm and 0.3 μm≤ Ra≤1.2 μm are referred to as "specific magnetic particles"; and a carrier including the specific magnetic particles and a resin layer is referred to as "specific carrier".

In the developer according to the present exemplary embodiment, with the above-described configuration, a difference in glossiness between a fixed image under a low-temperature and low-pressure condition and a fixed image under a high-temperature and high-pressure condition is small, and fog of an image is suppressed. The reason is presumed as follows. Hereinafter, the difference in glossiness between a fixed image under a low-temperature and low-pressure condition and a fixed image under a high-temperature and high-pressure condition is also called "difference in glossiness conditions".

As described above, in order to obtain good fixability, it is conceivable to use a developer containing a toner that is easily melted by heating. On the other hand, in a case where a developer containing the toner that is easily melted by heating is used for forming an image, the difference in glossiness conditions may be increased. It is presumed that such a difference may be made because the extent of deformation of the toner particles at a high temperature and a high strain is higher than the extent of deformation of toner particles at a low temperature and a low strain.

In addition, in the case where a developer containing the toner that is easily melted by heating is used for forming an image, fog may occur in the image. For example, in a case where the developer containing a toner and a carrier is shaken during transportation, as the carrier sinks under by weight, pressure is applied to the toner, and deforms the toner particles and reduces charging properties of the toner, so that the fog may occur easily. In particular, in a case where the developer cartridge that contains the replenishing developer containing a toner and a carrier is placed vertically with a developer output port facing downward, and then shaken during transportation, the carrier sinks under by weight and tends to gather near the developer output port. In a case where the gathered carrier and toner are supplied to the developing device at once, the charge of the toner cannot keep up with the charge, and the fog may occur easily.

On the other hand, in the present exemplary embodiment, the specific toner, that is, the toner in which each of D1 (90), D50 (90), D1 (150), and D50 (150) is 0.5 or more and 2.5 or less, a value of D50 (150)−D1 (150) is less than 1.5, and a value of D50 (90)−D1 (90) is less than 1.0 is used.

Here, the strain of 1% in the dynamic viscoelasticity measurement means applying 1% of displacement with respect to a height (that is, a gap) of the sample. That is, the strain of 1% corresponds to the application of a displacement having a small magnitude, and corresponds to a case where a fixing pressure is low in the toner fixing step. On the other hand, the strain of 50% corresponds to a case where the fixing pressure is high in the toner fixing step. The temperature of 90° C. and strain of 1% correspond to a fixing condition at a low temperature and a low pressure, the temperature of 150° C. and strain of 50% correspond to a fixing condition at a high temperature and a high pressure, and each loss tangent tanδ corresponds to the extent of deformation of the toner under each fixing condition.

In the specific toner, the change in loss tangent relative to the change in strain is small at both of 90° C. and 150° C. Therefore, it is presumed that, because the viscoelasticity of the toner at a high temperature and a high strain is similar to the viscoelasticity of the toner at a low temperature and a low strain, even though an image is fixed under a high-temperature and high-pressure condition, the difference in glossiness between the obtained fixed image and a fixed image fixed under a low-temperature and low-pressure condition is small.

In the present exemplary embodiment, the specific toner in which each of D1 (90), D50 (90), D1 (150), and D50 (150) is 0.5 or more and 2.5 or less is used in combination with the specific carrier using the specific magnetic particles in which 0.5 μm≤ Sm≤2.5 μm and 0.3 μm≤Ra≤1.2 μm are satisfied. By the combination of the carrier having the appropriate unevenness and the toner having the appropriate viscoelasticity, fine unevenness on the surface of the carrier is likely to be appropriately caught on the surface of the toner. Therefore, it is presumed that, even in a case where the developer is shaken, the carrier is suppressed from sinking under by weight, and the fog of the image is less likely to occur.

For the above reasons, in the present exemplary embodiment, it is presumed that the difference in glossiness conditions is small and the fog of the image is suppressed.

The loss tangent of the above-described toner is determined as follows.

Specifically, by a press molding machine, a toner as a measurement target is molded into tablets at room temperature (25° C.), thereby producing a measurement sample. Using a rheometer, dynamic viscoelasticity of the measurement sample is measured under the following conditions. From each of the obtained storage elastic modulus curve and the loss elastic modulus curve, the loss tangent tanδ at a temperature of 90° C. or 150° C. and a strain of 1% or 50% is determined, thereby obtaining D1 (90), D50 (90), D1 (150), and D50 (150).

Measurement Conditions

Measurement device: rheometer ARES-G2 (manufactured by TA Instruments)

Fixture: 8 mm parallel plates

Gap: adjusted to 3 mm

Frequency: 1 Hz

The method for obtaining the specific toner is not particularly limited.

Examples of the method for obtaining the specific toner include a method of evenly incorporating resin particles into both the region close to the surface of toner particles and the region close to the center of the toner particles, the resin particles having the storage elastic modulus G' of $1\times10^4$ Pa or more and $1\times10^6$ Pa or less in a range of 90° C. or higher and 150° C. or lower in the dynamic viscoelasticity measurement at a temperature rising rate of 2° C./min.

Hereinafter, the resin particles having the storage elastic modulus G' of $1\times10^4$ Pa or more and $1\times10^6$ Pa or less in a range of 90° C. or higher and 150° C. or lower are also called "specific resin particles".

It is not clear why the specific toner can be easily obtained by the method of evenly dispersing the specific resin particles in both the region close to the surface of the toner particles and the region close to the center of the toner particles, but is presumed to be as follows.

As described above, the specific resin particles are particles that have the storage elastic modulus G' of $1\times10^4$ Pa or more even though the temperature is raised to 150° C. That is, the specific resin particles are particles having a high elastic modulus at a high temperature. Therefore, it is presumed that, in a case where the toner particles contain the specific resin particles, the overall loss tangent of the toner at a high temperature and a high strain is unlikely to increase, and the difference between the overall loss tangent of the toner at a high temperature and a high strain and the overall loss tangent of the toner at a low temperature and a low strain is reduced.

In particular, it is presumed that, in a case where the specific resin particles are evenly dispersed in both the region close to the surface of the toner particles and the region close to the center of the toner particles, both the loss tangent of the toner at a low temperature and a low strain and the loss tangent of the toner at a high temperature and a high strain are reduced, and the difference between these loss tangents is also reduced, and as a result, the specific toner is easily obtained.

The storage elastic modulus G' of the resin particles, and a loss tangent tanδ and a glass transition temperature Tg of the resin particles, that will be described later, are determined as follows.

Specifically, by applying pressure to the resin particles as a measurement target, a disk-shaped sample having a thickness of 2 mm and a diameter of 8 mm is produced and used as a measurement sample. In a case of measuring the resin particles contained in the toner particles, the resin particles are isolated from the toner particles, and then used for producing the measurement sample. Examples of the method for isolating the resin particles from the toner particles include a method of immersing the toner particles in a solvent that dissolves the binder resin and does not dissolve the resin particles, and dissolving the binder resin in the solvent so as to isolate the resin particles.

The obtained disk-shaped sample as a measurement sample is interposed between parallel plates having a diameter of 8 mm, and dynamic viscoelasticity is measured under the following conditions by raising the measurement temperature from 10° C. to 150° C. at 2° C./min at a strain of 0.1% to 100%. From each of the storage elastic modulus curve and the loss elastic modulus curve obtained by the measurement, the storage elastic modulus G' and the loss tangent tanδ are determined. In addition, the peak temperature of the loss tangent tanδ is determined as the glass transition temperature Tg.

Measurement Conditions

Measurement device: rheometer ARES-G2 (manufactured by TA Instruments)

Gap: adjusted to 3 mm

Frequency: 1 Hz

As a specific method for measuring the average unevenness interval Sm and the arithmetic mean roughness Ra of the surface of the magnetic particles in the carrier described above, a method of observing surfaces of 50 magnetic particles at a magnification of 3,000 times using an ultra-depth color 3D shape measurement microscope (VK-9500, manufactured by KEYENCE Corporation) is used.

The average unevenness interval Sm is measured by acquiring the roughness curve from the three-dimensional shape of the observed surfaces of the magnetic particles and acquiring the average value of the intervals of one ridge-valley cycle acquired from the intersection where the roughness curve intersects with the average line. The reference length for acquiring the Sm value is 10 μm, and the cut-off value is 0.08 mm.

The arithmetic mean roughness Ra is acquired by acquiring a roughness curve, and summing and averaging the measured value of the roughness curve and the absolute value of the deviation to the average value. The reference length for acquiring the Ra value is 10 μm, and the cut-off value is 0.08 mm.

The Sm value and the Ra value are measured in conformity with JIS B 0601 (1994 edition).

In addition, examples of a method of separating the magnetic particles from the carrier include a method of dissolving a resin coating layer with an organic solvent to separate the magnetic particles. In addition, the following method may also be mentioned.

As an example of the method of separating the magnetic particles from the carrier, more specifically, for example, 20 g of a resin-coated carrier is put into 100 mL of toluene. An ultrasonic wave is applied thereto for 30 seconds under the condition of 40 kHz. The magnetic particles and the resin solution are separated by using an arbitrary filter paper according to the particle size. The magnetic particles remaining on the filter paper are washed by pouring 20 mL of toluene from above. Next, the magnetic particles remaining on the filter paper are collected. Similarly, the collected magnetic particles are put into 100 mL of toluene, and an ultrasonic wave is applied thereto for 30 seconds under the condition of 40 kHz. The magnetic particles are filtered in the same manner, washed with 20 mL of toluene, and then collected. This process is performed 10 times. Finally, the collected magnetic particles are dried.

A method of controlling the average unevenness interval Sm and the arithmetic mean roughness Ra of the magnetic particles is not particularly limited.

For example, the average unevenness interval Sm and the arithmetic mean roughness Ra of the magnetic particles are controlled by adjusting the temperature during main firing, adjusting the oxygen concentration during main firing, adjusting addition amount of $SiO_2$, adding at least one selected from the group consisting of a Ca component and an Sr component, and the like.

In the present exemplary embodiment, from the viewpoint that the difference in glossiness conditions is reduced and the fog of the image is suppressed, a BET specific surface area of the magnetic particles is, for example, preferably 0.12 $m^2/g$ or more and 0.20 $m^2/g$ or less. In addition, in the present exemplary embodiment, from the viewpoint that the difference in glossiness conditions is reduced and the fog of the image is suppressed, a volume-average particle size of the magnetic particles is, for example, preferably 26 μm or more and 34 μm or less.

The BET specific surface area of the magnetic particles is measured by a three-point nitrogen substitution method using a SA3100 specific surface area measurement device (manufactured by Beckman Coulter KK). Specifically, 5 g of the magnetic particles are put into a cell, deaeration treatment is performed at 60° C. for 120 minutes, and the three-point nitrogen substitution method is performed using a mixed gas of nitrogen and helium (30:70).

Volume-average particle sizes of the magnetic particles and the carrier described later are values measured by a laser diffraction type particle size distribution analyzer LA-700 (manufactured by HORIBA, Ltd.). Specifically, for the particle size range (channel) divided using a particle size distribution obtained by the measurement device, a cumulative volume distribution is plotted from the small-sized particles, and the particle size at which the cumulative percentage of the particles reaches 50% is adopted as the volume-average particle size.

A method of controlling the BET specific surface area and the volume-average particle size of the magnetic particles is not particularly limited.

For example, the BET specific surface area of the magnetic particles are controlled by adjusting the temperature during main firing, adjusting the oxygen concentration during main firing, adjusting addition amount of $SiO_2$, adding at least one selected from the group consisting of a Ca component and an Sr component, post-heating after main firing, and the like. The volume-average particle size of the magnetic particles is controlled by, for example, controlling the particle size during granulation such as spray-drying, crushing after main firing, classification, and the like.

Hereinafter, details of the toner and the carrier contained in the developer according to the present exemplary embodiment will be described.

Toner

The toner according to the present exemplary embodiment includes toner particles, and external additives that are used as necessary.

Toner Particles

The toner particles contain at least a binder resin, and may contain other components as necessary.

For example, the toner particles preferably contain resin particles in addition to the binder resin.

By further containing the resin particles in the toner particles, it is presumed that the extent of deformation of the toner-fixed image with respect to the fixing pressure is suppressed, and a fixed image with a small difference in glossiness is obtained.

The above-described resin particles are, for example, preferably crosslinked resin particles.

The "crosslinked resin particles" herein refer to resin particles having a crosslinked structure between specific atoms in the polymer structure contained in the resin particles.

In a case where crosslinked resin particles are used as the resin particles, the storage elastic modulus G' of the specific resin particles is likely to fall into the above range in a range of 90° C. or higher and 150° C. or lower, and the specific toner is easily obtained.

As the above-described crosslinked resin particles, for example, styrene (meth)acrylic resin particles are preferable.

In a case where the crosslinked resin particles are the styrene (meth)acrylic resin particles, the storage elastic modulus G' of the specific resin particles is likely to fall into the above range in a range of 90° C. or higher and 150° C. or lower, and the specific toner is easily obtained.

As described above, from the viewpoint of obtaining the specific toner, for example, it is preferable that the toner particles contain the specific resin particles as the above-described resin particles.

Hereinafter, as an example of the toner particles contained in the specific toner, toner particles containing a binder resin and the specific resin particles will be described.

The toner particles include, for example, the binder resin, the specific resin particles, and as necessary, a colorant, a release agent, and other additives.

Binder Resin

Examples of the binder resin include vinyl-based resins consisting of a homopolymer of a monomer, such as styrenes (for example, styrene, p-chlorostyrene, α-methylstyrene, and the like), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate, and the like), ethylenically unsaturated nitriles (acrylonitrile, methacrylonitrile, and the like), vinyl ethers (for example, vinyl methyl ether, vinyl isobutyl ether, and the like), vinyl ketones (for example, vinyl methyl ketone, vinyl ethyl ketone, vinyl isopropenyl ketone, and the like), olefins (for example, ethylene, propylene, butadiene, and the like), or a copolymer obtained by combining two or more kinds of monomers described above.

Examples of the binder resin include non-vinyl-based resins such as an epoxy resin, a polyester resin, a polyurethane resin, a polyamide resin, a cellulose resin, a polyether resin, and modified rosin, mixtures of these with the vinyl-based resins, or graft polymers obtained by polymerizing a vinyl-based monomer together with the above resins.

One kind of each of these binder resins may be used alone, or two or more kinds of these binder resins may be used in combination.

For example, the binder resin preferably contains a polyester resin.

In a case where the binder resin contains a polyester resin, in a case of using the styrene (meth)acrylic resin particles as the specific resin particles, a difference between an SP value (S) as a solubility parameter of the specific resin particles and an SP value (R) as a solubility parameter of the binder resin (SP value (S)−SP value (R)), which will be described later, is likely to fall into, for example, a preferred numerical range. Therefore, the specific resin particles are likely to be dispersed in the toner particles, and as a result, the difference in glossiness conditions is reduced.

In a case where the difference (SP value (S)−SP value (R)) is within the above-described range, compared to a case where the difference is too small, since affinity between the binder resin and the specific resin particles is high, it is possible to suppress a decrease in dispersibility due to partial compatibility. In addition, in a case where the difference (SP value (S)−SP value (R)) is within the above-described range, compared to a case where the difference is too large, since the affinity between the binder resin and the specific resin particles is low, the specific resin particles are prevented from being included in the toner particles and discharged to the surface of the toner particles or to the outside of the toner particles.

For example, it is preferable that the binder resin contains a crystalline resin and an amorphous resin.

The crystalline resin means a resin having a clear endothermic peak instead of showing a stepwise change in endothermic amount, in differential scanning calorimetry (DSC).

On the other hand, the amorphous resin means a resin that shows only a stepwise change in amount of heat absorbed instead of having a clear endothermic peak in a case where the resin is measured by a thermoanalytical method using differential scanning calorimetry (DSC), and stays as a solid at room temperature but turns thermoplastic at a temperature equal to or higher than a glass transition temperature.

Specifically, for example, the crystalline resin refers to a resin that has a half-width of an endothermic peak of 10° C. or less in a case where the resin is measured at a temperature rising rate of 10° C./min, and the amorphous resin refers to a resin that has a half-width of more than 10° C. or a resin for which a clear endothermic peak is not observed.

The crystalline resin will be described.

Examples of the crystalline resin include known crystalline resins such as a crystalline polyester resin, and a crystalline vinyl resin (such as a polyalkylene resin and a long-chain alkyl (meth)acrylate resin). Among the crystalline resins, in view of mechanical strength and low-temperature fixability of the toner, for example, a crystalline polyester resin is preferable.

Crystalline Polyester Resin

Examples of the crystalline polyester resin include a polycondensate of polyvalent carboxylic acid and polyhydric alcohol. As the crystalline polyester resin, a commercially available product or a synthetic resin may be used.

Here, since the crystalline polyester resin easily forms a crystal structure, the crystalline polyester resin is, for example, preferably a polycondensate that is not formed of an aromatic-containing polymerizable monomer but is formed of a linear aliphatic polymerizable monomer.

Examples of the polyvalent carboxylic acid include aliphatic dicarboxylic acids (such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (such as dibasic acids such as phthalic acid, isophthalic acid, terephthalic acid, and naphthalene-2,6-dicarboxylic acid), anhydrides of these dicarboxylic acids, and lower alkyl esters (for example, having 1 or more and 5 or less carbon atoms) of these dicarboxylic acids.

As the polyvalent carboxylic acid, a carboxylic acid having a valency of 3 or more that has a crosslinked structure or a branched structure may be used in combination with a dicarboxylic acid. Examples of the trivalent carboxylic acids include aromatic carboxylic acid (for example, 1,2,3-benzenetricarboxylic acid, 1,2,4-benzenetricarboxylic acid, 1,2,4-naphthalenetricarboxylic acid, and the like), anhydrides of these aromatic carboxylic acids, and lower alkyl esters (for example, having 1 or more and 5 or less carbon atoms) of these aromatic carboxylic acids.

As the polyvalent carboxylic acid, a dicarboxylic acid having a sulfonic acid group or a dicarboxylic acid having an ethylenically double bond may be used together with these dicarboxylic acids.

One kind of polyvalent carboxylic acid may be used alone, or two or more kinds of polyvalent carboxylic acids may be used in combination.

Examples of the polyhydric alcohol include an aliphatic diol (for example, a linear aliphatic diol having 7 or more and 20 or less carbon atoms in a main chain portion). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among the aliphatic diols, for example, 1,8-octanediol, 1,9-nonanediol, or 1,10-decanediol is preferable.

As the polyhydric alcohol, an alcohol having a valency of 3 or more, that forms a crosslinked structure or a branched structure, may be used in combination with the diol.

Examples of the alcohol having a valency of 3 or more include glycerin, trimethylolethane, and trimethylolpropane, pentaerythritol.

One kind of polyhydric alcohol may be used alone, or two or more kinds of polyhydric alcohols may be used in combination.

Here, the content of the aliphatic diol in the polyhydric alcohol may be 80% by mole or more and, for example, preferably 90% by mole or more.

The melting temperature of the crystalline polyester resin is, for example, preferably 50° C. or higher and 100° C. or lower, more preferably 55° C. or higher and 90° C. or lower, and even more preferably 60° C. or higher and 85° C. or lower.

The melting temperature is determined from a DSC curve obtained by differential scanning calorimetry (DSC) by "peak melting temperature" described in the method for determining the melting temperature in JIS K7121-1987, "Testing methods for transition temperatures of plastics".

The weight-average molecular weight (Mw) of the crystalline polyester resin is, for example, preferably 6,000 or more and 35,000 or less.

The crystalline polyester resin can be obtained by a well-known manufacturing method, for example, same as the amorphous polyester resin.

In a case where the toner particles contain the crystalline resin, a content of the crystalline resin with respect to the total mass of the binder resin is, for example, preferably 4% by mass or more and 50% by mass or less, more preferably 6% by mass or more and 30% by mass or less, and even more preferably 8% by mass or more and 20% by mass or less.

In a case where the content of the crystalline resin is within the above-described range, better fixability is obtained as compared with a case where the ratio of the crystalline resin contained in the toner particles is lower than the above-described range. In addition, in a case where the content of the crystalline resin is within the above-described range, compared to a case where the content of the crystalline resin is higher than the above-described range, an excessive increase in glossiness of the fixed image fixed under a high-temperature and high-pressure condition due to too much crystalline resin having relatively low elasticity is further suppressed. As a result, the difference in glossiness conditions is reduced.

The amorphous resin will be described.

Examples of the amorphous resin include known amorphous resins such as an amorphous polyester resin, an amorphous vinyl resin (such as a styrene acrylic resin), an epoxy resin, a polycarbonate resin, and a polyurethane resin. Among the amorphous resins, for example, an amorphous polyester resin or an amorphous vinyl resin (particularly, a styrene acrylic resin) is preferable, and an amorphous polyester resin is more preferable.

Amorphous Polyester Resin

Examples of the amorphous polyester resin include a polycondensate of a polyvalent carboxylic acid and a polyhydric alcohol. As the amorphous polyester resin, a commercially available product or a synthetic resin may be used.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, sebacic acid, and the like), alicyclic dicarboxylic acid (for example, cyclohexanedicarboxylic acid and the like), aromatic dicarboxylic acids (for example, terephthalic acid, isophthalic acid, phthalic acid, naphthalenedicarboxylic acid, and the like), anhydrides of these, and lower alkyl esters (for example, having 1 or more and 5 or less carbon atoms). Among these, for example, aromatic dicarboxylic acids are preferable as the polyvalent carboxylic acid.

As the polyvalent carboxylic acid, a carboxylic acid having a valency of 3 or more that has a crosslinked structure or a branched structure may be used in combination with a dicarboxylic acid. Examples of the carboxylic acid having a valency of 3 or more include trimellitic acid, pyromellitic acid, anhydrides of these acids, and lower alkyl esters (for example, having 1 or more and 5 or less carbon atoms) of these acids.

One kind of polyvalent carboxylic acid may be used alone, or two or more kinds of polyvalent carboxylic acids may be used in combination.

Examples of the polyhydric alcohol include aliphatic diols (for example, ethylene glycol, diethylene glycol, triethylene glycol, propylene glycol, butanediol, hexanediol, neopentyl glycol, and the like), alicyclic diols (for example, cyclohexanediol, cyclohexanedimethanol, hydrogenated bisphenol A, and the like), and aromatic diols (for example, an ethylene oxide adduct of bisphenol A, a propylene oxide adduct of bisphenol A, and the like). Among the polyhydric alcohols, for example, an aromatic diol or an alicyclic diol is preferable, and an aromatic diol is more preferable.

As the polyhydric alcohol, a polyhydric alcohol having three or more hydroxyl groups and a crosslinked structure or a branched structure may be used in combination with a diol. Examples of the polyhydric alcohol having three or more hydroxyl groups include glycerin, trimethylolpropane, and pentaerythritol.

One kind of polyhydric alcohol may be used alone, or two or more kinds of polyhydric alcohols may be used in combination.

The glass transition temperature (Tg) of the amorphous polyester resin is, for example, preferably 50° C. or higher and 80° C. or lower, and more preferably 50° C. or higher and 65° C. or lower.

The glass transition temperature is determined from a DSC curve obtained by differential scanning calorimetry (DSC). More specifically, the glass transition temperature is determined by "extrapolated glass transition onset temperature" described in the method for determining a glass transition temperature in JIS K 7121-1987, "Testing methods for transition temperatures of plastics".

The weight-average molecular weight (Mw) of the amorphous polyester resin is, for example, preferably 5,000 or more and 1,000,000 or less, and more preferably 7,000 or more and 500,000 or less.

The number-average molecular weight (Mn) of the amorphous polyester resin is, for example, preferably 2,000 or more and 100,000 or less.

The molecular weight distribution Mw/Mn of the amorphous polyester resin is, for example, preferably 1.5 or more and 100 or less, and more preferably 2 or more and 60 or less.

The weight-average molecular weight and the number-average molecular weight are measured by gel permeation chromatography (GPC). By GPC, the molecular weight is measured using GPC. HLC-8120GPC manufactured by Tosoh Corporation as a measurement device, TSKgel Super HM-M (15 cm) manufactured by Tosoh Corporation as a column, and THF as a solvent. The weight-average molecular weight and the number-average molecular weight are calculated using a molecular weight calibration curve plotted using a monodisperse polystyrene standard sample from the measurement results.

The amorphous polyester resin is obtained by a well-known manufacturing method. Specifically, for example, the polyester resin is obtained by a method of setting a polymerization temperature to 180° C. or higher and 230° C. or lower, reducing the internal pressure of a reaction system as necessary, and carrying out a reaction while removing water or an alcohol generated during condensation.

In a case where monomers as raw materials are not dissolved or compatible at the reaction temperature, in order to dissolve the monomers, a solvent having a high boiling point may be added as a solubilizer. In this case, a polycondensation reaction is carried out in a state where the solubilizer is distilled off. In a case where a monomer with poor compatibility takes part in the reaction, for example, the monomer with poor compatibility may be condensed in advance with an acid or an alcohol that is to be polycondensed with the monomer, and then polycondensed together with the main component.

The binder resin preferably contains, for example, a polyester resin having an aliphatic dicarboxylic acid unit (that is a structural unit derived from an aliphatic dicarboxylic acid). In a case where the polyester resin as the binder resin has an aliphatic dicarboxylic acid unit, compared to a case where the polyester resin has only an aromatic dicarboxylic acid unit, since flexibility of the binder resin increases, it is possible to disperse the specific resin particles in a more uniform state, and it is possible to further reduce the range of change in loss tangent tanδ.

In addition, the binder resin preferably contains, for example, an amorphous polyester resin having an aliphatic dicarboxylic acid unit and a crystalline polyester resin having an aliphatic dicarboxylic acid unit. In a case where the binder resin includes an amorphous polyester resin and a crystalline polyester resin, since both resins have an aliphatic dicarboxylic acid unit, the specific resin particles can be dispersed more uniformly.

As the aliphatic dicarboxylic acid, for example, a saturated aliphatic dicarboxylic acid represented by General Formula "$HOOC—(CH_2)_n—COOH$" can be preferably used. n in the general formula is, for example, preferably 4 to 20, and more preferably 4 to 12.

The content of the binder resin with respect to the total amount of the toner particles is, for example, preferably 40% by mass or more and 95% by mass or less, more preferably 50% by mass or more and 90% by mass or less, and even more preferably 60% by mass or more and 85% by mass or less.

In a case where the content of the specific resin particles is set as 1, a ratio of the content of the crystalline resin to the content of the specific resin particles is, for example, preferably 0.2 or more and 10 or less, and more preferably 1 or more and 5 or less.

In a case where the ratio of the content of the crystalline resin to the content of the specific resin particles is within the above-described range, compared to a case of being less than 0.2, a decrease in meltability of the toner due to an excessively small amount of the low-viscosity component at 90° C. or higher and 150° C. or lower in the toner and an increase in the contribution of the specific resin particles, that are highly elastic components, is suppressed, and the fixability is improved.

In addition, in a case where the ratio of the content of the crystalline resin to the content of the specific resin particles is within the above-described range, compared to a case of being more than 10, it is possible to suppress the extent of deformation of the toner due to heat and pressure from the fixing device due to excessive reduction components, and to reduce the difference in glossiness due to fixing conditions.

In a case where the content of the specific resin particles is set as 1, a ratio of the content of the amorphous resin to the content of the specific resin particles is, for example, preferably 1.3 or more and 45 or less, and more preferably 3 or more and 15 or less.

Specific Resin Particles

The specific resin particles are not particularly limited as long as the specific resin particles are resin particles having the storage elastic modulus G' of $1\times10^4$ Pa or more and $1\times10^6$ Pa or less in a range of 90° C. or higher and 150° C. or lower in dynamic viscoelasticity measurement at a temperature rising rate of 2° C./min.

The storage elastic modulus G' of the specific resin particles in the range of 90° C. or higher and 150° C. or lower is, for example, preferably $1\times10^5$ Pa or more and $8\times10^5$ Pa or less, and more preferably $1\times10^5$ Pa or more and $6\times10^5$ Pa or less.

In a case where the resin particles having the storage elastic modulus G' within the above-described range in the range of 90° C. or higher and 150° C. or lower are used, an excessive increase of glossiness of a fixed image fixed under a high-temperature and high-pressure condition is further suppressed as compared with a case where resin particles having the storage elastic modulus G' lower than the above-described range is used. As a result, the difference in glossiness conditions is reduced. In addition, in a case where the resin particles having the storage elastic modulus G' within the above-described range in the range of 90° C. or higher and 150° C. or lower are used, deterioration of fixability resulting from excessively high elasticity of toner particles is further suppressed, and better fixability is likely to obtained as compared with a case where resin particles having the storage elastic modulus G' lower than the above-described range are used.

In the dynamic viscoelasticity measurement at a temperature rising rate of 2° C./min, a loss tangent tanδ of the specific resin particles in a range of 30° C. or higher and 150° C. or lower is, for example, preferably 0.01 or more and 2.5 or less. In particular, in a range of 65° C. or higher and 150° C. or lower, the loss tangent tanδ of the specific resin particles is, for example, more preferably 0.01 or more and 1.0 or less, and even more preferably 0.01 or more and 0.5 or less.

In a case where the loss tangent tanδ of the specific resin particles within the above-described range in the range of 30° C. or higher and 150° C. or lower, the toner particles are more likely to be deformed during fixing, and better fixability is likely to be obtained as compared with a case where the loss tangent tanδ of the specific resin particles is lower than the above-described range. In addition, in a case where the loss tangent tanδ of the specific resin particles in a range of 65° C. or higher and 150° C. or lower, that is the temperature at which the toner particles are more likely to be deformed, is within the above-described range, an excessive increase of glossiness of a fixed image fixed under a high-temperature and high-pressure condition is further suppressed as compared with a case where the loss tangent tanδ of the specific resin particles is higher than the above-described range. As a result, the difference in glossiness conditions is reduced.

Crosslinked Resin Particles

The specific resin particles are, for example, preferably crosslinked resin particles.

Here, in order to encapsulate the specific resin particles in the toner particles, for example, it is preferable that the specific resin particles have a high affinity with the binder resin. Examples of a method for increasing the above-described affinity include a method of controlling the SP value and a method of using a surfactant as a dispersant for the specific resin particles. However, in a case where specific resin particles having a high affinity with the binder resin are used, since the specific resin particles are composed of an organic polymer unlike inorganic fillers, carbon black, metal particles, and the like, the specific resin particles tend to be compatible with the binder resin, and the dispersibility may be lowered.

On the other hand, in a case where specific resin particles having a low affinity with the binder resin are used, the specific resin particles are difficult to be encapsulated in the toner particles, and may be discharged to the surface of the toner particles or the outside of the toner particles.

By using the specific resin particles having an intermediate affinity with the binder resin, that is between the specific resin particles having a high affinity and the specific resin particles having a low affinity, it is possible to encapsulate the specific resin particles in the toner particles to some extent. However, regardless of toner manufacturing method such as an emulsification aggregation method and a kneading and pulverizing method, in a case where the specific resin particles come into contact with each other, the specific resin particles have a high affinity because the specific resin particles are the same type of material, and in some cases, the specific resin particles are unevenly distributed while maintaining the contact state, and it is difficult to evenly dispose the specific resin particles in the toner particles. It is considered that one of the reasons why the specific resin particles maintain the state of being in contact with each other is that polymer chains of polymer components constituting the specific resin particles are entangled at the time of contact.

Therefore, by using the crosslinked resin particles as the specific resin particles, it is possible to suppress the entanglement of the polymer chains, to prevent the polymer chains from being in the state of being in contact with each other, and to disperse the specific resin particles evenly in the toner particles.

Examples of the crosslinked resin particles include crosslinked resin particles crosslinked by an ionic bond (ionically crosslinked resin particles), and crosslinked resin particles crosslinked by a covalent bond (covalently crosslinked resin particles). Among these crosslinked resin particles, for example, crosslinked resin particles crosslinked by a covalent bond are preferable.

Examples of the type of the resin used for the crosslinked resin particles include a polyolefin-based resin (such as polyethylene and polypropylene), a styrene-based resin (such as polystyrene and α-polymethylstyrene), a (meth)acrylic resin (such as polymethyl methacrylate and polyacrylonitrile), an epoxy resin, a polyurethane resin, a polyurea resin, a polyamide resin, a polycarbonate resin, a polyether resin, a polyester resin, and copolymer resins of these compounds. As necessary, each of these resins may be used alone, or two or more of these resins may be used in combination.

Among the above-described resins, as the resin used for the crosslinked resin particles, for example, a styrene (meth) acrylic resin that is a copolymer resin of a styrene-based resin and a (meth)acrylic resin is preferable.

That is, as the crosslinked resin particles, for example, styrene (meth)acrylic resin particles are preferable.

Examples of the styrene-(meth)acrylic resin include a resin obtained by polymerizing the following styrene-based monomer and (meth)acrylic acid-based monomer by radical polymerization.

Examples of the styrene-based monomer include styrene, α-methylstyrene, vinylnaphthalene; alkyl-substituted styrene with an alkyl chain, such as 2-methylstyrene, 3-methylstyrene, 4-methylstyrene, 2-ethylstyrene, 3-ethylstyrene, and 4-ethylstyrene; halogen-substituted styrene such as 2-chlorostyrene, 3-chlorostyrene, and 4-chlorostyrene; and fluorine-substituted styrene such as 4-fluorostyrene and 2,5-difluorostyrene. Among the styrene-based monomers, for example, styrene or α-methylstyrene is preferable.

Examples of the (meth)acrylic acid-based monomer include (meth)acrylic acid, n-methyl (meth)acrylate, n-ethyl (meth)acrylate, n-propyl (meth)acrylate, n-butyl (meth) acrylate, n-pentyl (meth)acrylate, n-hexyl (meth)acrylate, n-heptyl (meth)acrylate, n-octyl (meth)acrylate, n-decyl (meth)acrylate, n-dodecyl (meth)acrylate, n-lauryl (meth) acrylate, n-tetradecyl (meth)acrylate, n-hexadecyl (meth) acrylate, n-octadecyl (meth)acrylate, isopropyl (meth)acrylate, isobutyl (meth)acrylate, t-butyl (meth)acrylate, isopentyl (meth)acrylate, amyl (meth)acrylate, neopentyl (meth)acrylate, isohexyl (meth)acrylate, isoheptyl (meth) acrylate, isooctyl (meth)acrylate, 2-ethylhexyl (meth)acrylate, phenyl (meth)acrylate, biphenyl (meth)acrylate, diphenylethyl (meth)acrylate, t-butylphenyl (meth)acrylate, terphenyl (meth)acrylate, cyclohexyl (meth)acrylate, t-butylcyclohexyl (meth)acrylate, dimethylaminoethyl (meth) acrylate, diethylaminoethyl (meth)acrylate, methoxyethyl (meth)acrylate, 2-hydroxyethyl (meth)acrylate, 2-carboxyethyl (meth)acrylate, (meth)acrylonitrile, and (meth)acrylamide. Among these, for example, n-butyl (meth)acrylate or 2-carboxyethyl (meth)acrylate is preferable.

In the crosslinked resin particles, examples of a crosslinking agent for crosslinking the resin include aromatic polyvinyl compounds such as divinylbenzene and divinylnaphthalene; polyvinyl esters of aromatic polyvalent carboxylic acids, such as divinyl phthalate, divinyl isophthalate, divinyl terephthalate, divinyl homophthalate, divinyl trimesate, trivinyl trimesate, divinyl naphthalenedicarboxylate, and divinyl biphenylcarboxylate; divinyl esters of nitrogen-containing aromatic compounds, such as divinyl pyridine dicarboxylate; vinyl esters of unsaturated heterocyclic compound carboxylic acid, such as vinyl pyromutate, vinyl furan carboxylate, vinyl pyrrole-2-carboxylate, and vinyl thiophene carboxylate; (meth)acrylic acid esters of linear polyhydric alcohols, such as butanediol diacrylate, butanediol dimethacrylate, hexanediol diacrylate, hexanediol dimethacrylate, octanediol diacrylate, octanediol dimethacrylate, nonanediol diacrylate, nonanediol dimethacrylate, decanediol diacrylate, decanediol dimethacrylate, dodecanediol diacrylate, and dodecanediol dimethacrylate; (meth)acrylic acid esters of branched substituted polyhydric alcohols, such as neopentylglycol dimethacrylate and 2-hydroxy, 1,3-diacryloxypropane; and polyvinyl esters of polyvalent carboxylic acids, such as polyethylene glycol di(meth)acrylate, polypropylene polyethylene glycol di(meth) acrylates, divinyl succinate, divinyl fumarate, vinyl maleate, divinyl maleate, divinyl diglycolate, vinyl itaconate, divinyl itaconate, divinyl acetone dicarboxylate, divinyl glutarate, 3,3'-divinylthiodipropionate, divinyl trans-aconitate, trivinyl trans-aconitate, divinyl adipate, divinyl pimelate, divinyl suberate, divinyl azelate, divinyl sebacate, divinyl dodecanedioate, and divinyl brassylate. One kind of crosslinking agent may be used alone, or two or more kinds of crosslinking agents may be used in combination.

Among these crosslinking agents, for example, it is preferable to use a bifunctional alkyl acrylate having an alkylene chain having 6 or more carbon atoms as the crosslinking agent for crosslinking the resin. That is, for example, the crosslinked resin particles preferably have a bifunctional alkyl acrylate as a constitutional unit, and the number of carbon atoms in the alkylene chain of the bifunctional alkyl acrylate is 6 or more.

By using crosslinked resin particles having the bifunctional alkyl acrylate as a constitutional unit, in which the number of carbon atoms in the alkylene chain is 6 or more, it is easier to obtain the specific toner. For the specific toner, it is necessary to suppress the extent of deformation of the toner particles within a certain range even under high-pressure fixing conditions in order to suppress the difference in glossiness. In a case where a difference in elasticity between the specific resin particles as the crosslinked resin particles and the binder resin is too large, it may be difficult to obtain the effect of suppressing the change in loss tangent tanδ by the specific resin particles. Therefore, for example, it is preferable to control crosslinkability such that the elasticity of the specific resin particles is not too high. In a case where a crosslinking density of the specific resin particles is high (that is, a distance between crosslinking points is short), elasticity is too high, but in a case where a bifunctional acrylate having a long alkylene chain is used as the crosslinking agent, the crosslinking density is low (that is, the distance between crosslinking points is long), and it is possible to prevent the elasticity of the specific resin particles from being too high. As a result, the difference in glossiness can be further suppressed.

From the viewpoint of adjusting the crosslinking density to an appropriate range, the number of carbon atoms in the alkylene chain of the bifunctional alkyl acrylate is, for example, preferably 6 or more, more preferably 6 or more and 12 or less, and even more preferably 8 or more and 12 or less. More specific examples of the bifunctional alkyl acrylate include 1,6-hexanediol acrylate, 1,6-hexanediol methacrylate, 1,8-octanediol diacrylate, 1,8-octanediol dimethacrylate, 1,9-nonanediol diacrylate, 1,9-nonanediol dimethacrylate, 1,10-decanediol diacrylate, 1,10-decanediol dimethacrylate, 1,12-dodecanediol diacrylate, and 1,12-dodecanediol dimethacrylate, and among these, for example, 1,10-decanediol diacrylate or 1,10-decanediol dimethacrylate is preferable.

In a case where the specific resin particles are a polymer of a composition for forming specific resin particles containing a styrene-based monomer, a (meth)acrylic acid-based monomer, and a crosslinking agent, the amount of the crosslinking agent contained in the composition may be adjusted so that the viscoelasticity of the specific resin particles is controlled. For example, by increasing the amount of the crosslinking agent contained in the composition, it is easy to obtain resin particles having a high storage elastic modulus G'. The content of the crosslinking agent in the composition for forming the specific resin particles with respect to, for example, the total of 100 parts by mass of the styrene-based monomer, the meth)acrylic acid-based monomer, and the crosslinking agent is preferably 0.3 parts by mass or more and 5.0 parts by mass or less, more preferably 0.5 parts by mass or more and 2.5 parts by mass or less, and even more preferably 1.0 parts by mass or more and 2.0 parts by mass or less.

The glass transition temperature Tg of the specific resin particles obtained from the dynamic viscoelasticity measurement is, for example, preferably 10° C. or higher and 45° C. or lower. In a case where the glass transition temperature Tg of the specific resin particles is 10° C. or higher and 45° C. or lower, a toner in which the difference in glossiness between the fixed image in low-temperature and low-pressure conditions and the fixed image in high-temperature and high-pressure conditions is further reduced while obtaining the good fixability of the toner is obtained.

Further, the glass transition temperature Tg of the specific resin particles is, for example, more preferably 15° C. or higher and 40° C. or lower, and even more preferably 20° C. or higher and 35° C. or lower.

In a case where the glass transition temperature Tg of the specific resin particles is within the above-described range, compared to a case where Tg is too low, since a difference in Tg with the binder resin is large, uneven distribution of the resin particles in the toner particles is suppressed, the dispersion state of the specific resin particles that is nearly uniform is easily maintained, the effect of suppressing deformation against pressure during fixing is easily obtained, and the difference in glossiness is reduced. In addition, in a case where the glass transition temperature Tg of the specific resin particles is within the above-described range, compared to a case where Tg is too high, deterioration of the low-temperature fixability due to deterioration of meltability of the binder resin is suppressed.

A number-average particle size of the specific resin particles is, for example, preferably 60 nm or more and 300 nm or less, more preferably 100 nm or more and 200 nm or less, and even more preferably 130 nm or more and 170 nm or less.

In a case where the number-average particle size of the specific resin particles is within the above-described range, compared to a case of being lower than the above-described range, deterioration of fixability resulting from the fact that the toner particles are easily affected by high elasticity of the specific resin particles is suppressed, and better fixability is obtained. In addition, in a case where the number-average particle size of the specific resin particles is within the above-described range, compared to a case of being higher than the above-described range, since the specific resin particles are likely to disperse in a nearly uniform state in the toner particles, the toner tends to have similar viscoelasticity at a high temperature and a high strain and at a low temperature and a low strain. As a result, the difference in glossiness conditions is reduced.

The number-average particle size of the specific resin particles is a value measured using a transmission electron microscope (TEM).

As the transmission electron microscope, for example, JEM-1010 manufactured by JEOL Ltd. DATUM Solution Business Operations can be used.

Hereinafter, a method of measuring the number-average particle size of the specific resin particles will be specifically described.

The toner particles are cut in a thickness of approximately 0.3 μm with a microtome. A cross section of the toner particles is imaged at 4,500× magnification by using the transmission electron microscope, equivalent circle diameters of 1,000 resin particles dispersed in the toner particles are calculated based on the cross-sectional areas of the particles, and an arithmetic average thereof is calculated and adopted as the number-average particle size.

In addition, the number-average particle size of the specific resin particles may be a value measured by a laser diffraction type particle size distribution analyzer (for example, LA-700 manufactured by HORIBA, Ltd.) for the specific resin particle dispersion.

For example, it is preferable that the specific resin particles are evenly contained in both a region close to the surface of the toner particles (hereinafter, also referred to as "surface region") and a region close to the center of the toner particles (hereinafter, also referred to as "central region"). In a case where the specific resin particles are contained in both the surface region and the central region, the difference in glossiness conditions is further reduced as compared with a case where the specific resin particles are contained in only one of the surface region or the central region.

For example, in a case where the specific resin particles are contained only in the surface region, it is considered that the toner particles may be deformed a little at a low-temperature and low-pressure condition by being affected by the viscoelasticity in the surface region but may be deformed much at a high-temperature and high-pressure condition due to the influence of the viscoelasticity of the central region. Therefore, the difference in glossiness conditions may be increased. In addition, in a case where the specific resin particles are contained only in the central region, the toner particles are deformed a little under a low-temperature and low-pressure condition and make the specific resin particles poorly dispersed (unevenly distributed) in a fixed image, but deformed much under a high-temperature and high-pressure condition and are likely to make the specific resin particles excellently dispersed (practically evenly dispersed) in a fixed image. In a case where the specific resin particles are poorly dispersed in the fixed image, the portion where the specific resin particles exist forms a projection that is not easily deformed, and the portion where the specific resin particles do not exist forms a depression that is easily deformed, which leads to reduction of glossiness. In a case where the specific resin particles are excellently dispersed, the above-described state is suppressed, and the glossiness is improved. Therefore, the difference in glossiness conditions may be increased.

On the other hand, in a case where the specific resin particles are contained in both the surface region and the central region, unlike the case where the specific resin particles are contained only in the surface region or the case where the specific resin particles are contained only in the central region, it is presumed that the difference in glossiness conditions may be reduced.

The content of the specific resin particles with respect to the total amount of the toner particles is, for example, preferably 2% by mass or more and 30% by mass or less, more preferably 5% by mass or more and 25% by mass or less, and even more preferably 8% by mass or more and 20% by mass or less.

In a case where the content of the specific resin particles is within the above-described range, a toner having similar viscoelasticity at a high temperature and a high strain and at a low temperature and a low strain is more likely to be obtained, and the difference in glossiness conditions is further reduced as compared with a case where the content of the specific resin particles is lower than the above-described range. In addition, in a case where the content of the specific resin particles contained in the toner particles is in the above-described range, deterioration of fixability resulting from excessively high elasticity of the toner particles is further suppressed, and excellent fixability is more likely to be obtained as compared with a case where the content of the specific resin particles contained in the toner particles is higher than the above-described range.

Colorant

Examples of the colorant include various pigments such as carbon black, chrome yellow, Hansa yellow, benzidine yellow, threne yellow, quinoline yellow, pigment yellow, permanent orange GTR, pyrazolone orange, vulcan orange, watch young red, permanent red, brilliant carmine 3B, brilliant carmine 6B, Dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate; and various dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye.

One kind of colorant may be used alone, or two or more kinds of colorants may be used in combination.

As the colorant, a colorant having undergone a surface treatment as necessary may be used, or a dispersant may be used in combination with the colorant. Furthermore, a plurality of kinds of colorants may be used in combination.

The content of the colorant with respect to the total amount of the toner particles is, for example, preferably 1% by mass or more and 30% by mass or less, and more preferably 3% by mass or more and 15% by mass or less.

Release Agent

Examples of the release agent include hydrocarbon-based wax; natural wax such as carnauba wax, rice wax, and candelilla wax; synthetic or mineral petroleum-based wax such as montan wax; and ester-based wax such as fatty acid esters and montanic acid esters. The release agent is not limited to the agents.

The melting temperature of the release agent is, for example, preferably 50° C. or higher and 110° C. or lower, and more preferably 60° C. or higher and 100° C. or lower.

The melting temperature is determined from a DSC curve obtained by differential scanning calorimetry (DSC) by "peak melting temperature" described in the method for determining the melting temperature in JIS K7121-1987, "Testing methods for transition temperatures of plastics".

The content of the release agent with respect to the total amount of the toner particles is, for example, preferably 1% by mass or more and 20% by mass or less, and more preferably 5% by mass or more and 15% by mass or less.

Other Additives

Examples of other additives include well-known additives such as a magnetic material, a charge control agent, and inorganic powder. The additives are incorporated into the toner particles as internal additives.

Relationship of Composition in Toner Particles

Difference (SP Value (S)−SP Value (R))

A difference between an SP value (S) as a solubility parameter of the specific resin particles and an SP value (R) as a solubility parameter of the binder resin (SP value (S)−SP value (R)) is, for example, preferably −0.32 or more and −0.12 or less.

In a case where the difference (SP value (S)−SP value (R)) is within the above-described range, compared to a case where the difference is lower than the above-described range, the affinity between the specific resin particles and the binder resin, that configure most of the toner particles, is maintained at an appropriate level, and the specific resin particles are easily dispersed in the toner particles in a nearly uniform state. Therefore, the obtained toner is likely to have similar viscoelasticity at a high temperature and a high strain and at a low temperature and a low strain, and the difference in glossiness conditions is reduced. That is, compared to a case where the difference (SP value (S)−SP value (R)) is less than the above-described range, since the affinity between the binder resin and the specific resin particles is too high and the specific resin particles move easily in the toner particles, it is difficult for the specific resin particles to partially aggregate and reduce the effect of the specific resin particles.

In addition, in a case where the difference (SP value (S)−SP value (R)) is within the above-described range, compared to a case where the difference is more than the above-described range, excessive mixing or compatibility between the specific resin particles and the binder resin occurs during melting the toner, and an increase in melt viscosity of the toner as a whole is suppressed. As a result, deterioration of fixability resulting from excessively high viscoelasticity is suppressed, which brings an advantage of being capable of obtaining excellent fixability.

In a case where the binder resin is a mixed resin, a solubility parameter of a resin contained in the binder resin at the highest content ratio is adopted as the SP value (R).

The difference (SP value (S)−SP value (R)) is, for example, more preferably −0.32 or more and −0.12 or less, and even more preferably −0.29 or more and −0.18 or less.

The SP value (S) as the solubility parameter of the specific resin particles is, for example, preferably 9.00 or more and 9.15 or less, more preferably 9.03 or more and 9.12 or less, and even more preferably 9.06 or more and 9.10 or less.

Here, the SP value (S) as the solubility parameter of the specific resin particles and the SP value (R) as the solubility parameter of the binder resin (unit: $(cal/cm^3)^{1/2}$) are calculated by Okitsu method. Details of the Okitsu method are described in "Journal of the Adhesion Society of Japan, Vol. 29, No. 5 (1993)".

Viscoelasticity of Components (Extra Components) Excluding Specific Resin Particles For example, it is preferable that a storage elastic modulus G' of components of the toner particles, excluding the specific resin particles, is $1\times10^8$ Pa or more in a range of 30° C. or higher and 50° C. or lower, and that a temperature at which the storage elastic modulus G' reaches less than $1\times10^5$ Pa is 65° C. or higher and 90° C. or lower. Hereinafter, the components of the toner particles, excluding the specific resin particles, are referred to as "extra components", and a temperature at which the storage elastic modulus G' reaches less than $1\times10^5$ Pa is referred to as a "specific elastic modulus reached temperature". The extra components having the storage elastic modulus G' satisfying the above-described conditions have a high elastic modulus at a low temperature and a low elastic modulus at a temperature of 65° C. or higher and 90° C. or lower. Therefore, in a case where the storage elastic modulus G' of the extra components satisfies the above-described conditions, the toner particles are more easily melted by heating, and better fixability is obtained as compared with a case where the temperature at which the storage elastic modulus G' of the extra components reaches a value less than $1\times10^5$ Pa is higher than 90° C.

The storage elastic modulus G' of the extra components at 30° C. or higher and 50° C. or lower is, for example, preferably $1\times10^8$ Pa or more, more preferably $1\times10^8$ Pa or more and $1\times10^9$ Pa or less, and even more preferably $2\times10^8$ Pa or more and $6\times10^8$ Pa or less.

In a case where the storage elastic modulus G' of the extra components in a range of 30° C. or higher and 50° C. or lower is within the above-described range, the storage stability of the toner is further improved as compared with in a case where the storage elastic modulus G' of the extra components in a range of 30° C. or higher and 50° C. is lower than the above-described range, and better fixability is likely to be obtained as compared with a case where the storage elastic modulus G' of the extra components in a range of 30° C. or higher and 50° C. is higher than the above-described range.

In addition, the specific elastic modulus reached temperature of the extra components is, for example, preferably 65° C. or higher and 90° C. or lower, more preferably 68° C. or higher and 80° C. or lower, and even more preferably 70° C. or higher and 75° C. or lower.

In a case where the specific elastic modulus reached temperature of the extra components is within the above-described range, the storage stability of the toner is further improved than in a case where the specific elastic modulus reached temperature of the extra component is lower than the above-described range, and the obtained fixability is likely to be better than in a case where the specific elastic modulus reached temperature of the extra component is higher than the above-described range.

A loss tangent tanδ of the extra components at the specific elastic modulus reached temperature is, for example, preferably 0.8 or more and 1.6 or less, more preferably 0.9 or more and 1.5 or less, and even more preferably 1.0 or more and 1.4 or less.

In a case where the loss tangent tanδ of the extra components at the specific elastic modulus reached temperature is within the above-described range, better fixability is likely to be obtained as compared with a case where the loss tangent tanδ of the extra components at the specific elastic modulus reached temperature is lower than the above-described range. In addition, in a case where the loss tangent tanδ of the extra components at the specific elastic modulus reached temperature is within the above-described range, the difference in glossiness conditions is further reduced as compared with a case where the loss tangent tanδ of the extra components at the specific elastic modulus reached temperature is higher than the above-described range.

The storage elastic modulus G' and the loss tangent tanδ of the extra components are determined as follows.

Specifically, first, only the extra components excluding the resin particles are isolated from the toner particles and molded into tablets at 25° C. by a press molding machine, thereby producing a measurement sample. Examples of a method of isolating only the extra components excluding the resin particles from the toner particles include a method of immersing the toner particles in a solvent that dissolves the binder resin and does not dissolve the resin particles and isolating the extra components by extraction.

The obtained measurement sample is interposed between parallel plates having a diameter of 8 mm, and dynamic viscoelasticity is measured under the following conditions by raising the measurement temperature from 30° C. to 150° C. at 2° C./min at a strain of 0.1% to 100%. From each of the storage elastic modulus curve and the loss elastic modulus curve obtained by the measurement, the storage elastic modulus G' and the loss tangent tanδ are determined.

Measurement Conditions

- Measurement device: rheometer ARES-G2 (manufactured by TA Instruments)
- Fixture: 8 mm parallel plates
- Gap: adjusted to 3 mm
- Frequency: 1 Hz Relationship Between Specific Resin Particles, Toner Particles, and Extra Components In a case where the storage elastic modulus of the specific resin particles in a range of 90° C. or higher and 150° C. or lower is represented by G' (p90-150), the storage elastic modulus of the toner particles in a range of 90° C. or higher and 150° C. or lower is represented by G' (t90-150), and the storage elastic modulus of the components of the toner particles, excluding the specific resin particles, in a range of 90° C. or higher and 150° C. or lower is represented by G' (r90-150), for example, it is preferable that G' (p90-150) is $1\times 10^4$ Pa or more and $1\times10^6$ Pa or less, and log G' (t90-150)−log G' (r90-150) is 1.0 or more and 4.0 or less.

In addition, the value of log G' (t90-150)−log G' (r90-150) is, for example, more preferably 1.0 or more and 3.5 or less, even more preferably 1.1 or more and 3.4 or less, and particularly preferably 1.2 or more and 3.3 or less.

The value of log G' (t90-150)−log G' (190-150) means a difference in viscoelasticity of the toner particles depending on whether or not the specific resin particles are added. By dispersing and encapsulating the specific resin particles in the toner particles in a nearly uniform state, the influence of the viscoelasticity of the specific resin particles on the viscoelasticity of the toner particles as a whole is suppressed. In addition, by controlling the value of log G' (t90-150)−log G' (r90-150) to be the above-described range, compared to a case of being lower than or higher than the above-described range, both good fixability and reduction in difference in glossiness conditions are achieved.

Characteristics of Toner Particles and the Like

The toner particles may be toner particles that have a single-layer structure or toner particles having a so-called core/shell structure that is configured with a core portion (core particle) and a coating layer (shell layer) coating the core portion.

The toner particles having a core/shell structure may, for example, be configured with a core portion that is configured with the binder resin, the specific resin particles, and other additives used as necessary, such as a colorant and a release agent, and a coating layer that is configured with the binder resin and the specific resin particles.

In a case where the toner particles have a core/shell structure, for example, it is preferable that both the core particles and the shell layer contain the specific resin particles. In a case where both the core particles and the shell layer contain the specific resin particles, since both the surface region and the central region of the toner particles contain the specific resin particles, the difference in glossiness conditions is further reduced.

A volume-average particle size (D50v) of the toner particles is, for example, preferably 2 μm or more and 10 μm or less, more preferably 4 μm or more and 8 μm or less, and even more preferably 4 μm or more and 6 μm or less.

The various average particle sizes and various particle size distribution indexes of the toner particles are measured using COULTER MULTISIZER II (manufactured by Beckman Coulter, Inc.) and using ISOTON-II (manufactured by Beckman Coulter, Inc.) as an electrolytic solution.

For measurement, a measurement sample in an amount of 0.5 mg or more and 50 mg or less is added to 2 ml of a 5% aqueous solution of a surfactant (for example, preferably sodium alkylbenzene sulfonate) as a dispersant. The obtained solution is added to an electrolytic solution in a volume of 100 ml or more and 150 ml or less.

The electrolytic solution in which the sample is suspended is subjected to a dispersion treatment for 1 minute with an ultrasonic disperser, and the particle size distribution of particles having a particle size in a range of 2 μm or more and 60 μm or less is measured using COULTER MULTISIZER II with an aperture having an aperture size of 100 μm. The number of particles to be sampled is 50,000.

For the particle size range (channel) divided based on the measured particle size distribution, a cumulative volume distribution and a cumulative number distribution are plotted from small-sized particles. The particle size at which the cumulative percentage of particles is 16% is defined as volume-based particle size D16v and a number-based particle size D16p. The particle size at which the cumulative percentage of particles is 50% is defined as volume-average particle size D50v and a cumulative number-average particle size D50p. The particle size at which the cumulative percentage of particles is 84% is defined as volume-based particle size D84v and a number-based particle size D84p.

By using these, a volume-average particle size distribution index (GSDv) is calculated as $(D84v/D16v)^{1/2}$, and a number-average particle size distribution index (GSDp) is calculated as $(D84p/D16p)^{1/2}$.

The average circularity of the toner particles is, for example, preferably 0.94 or more and 1.00 or less, and more preferably 0.95 or more and 0.98 or less.

The average circularity of the toner particles is determined by (equivalent circular perimeter)/(perimeter) [(perimeter of circle having the same projected area as particle image)/(perimeter of projected particle image)]. Specifically, the average circularity is a value measured by the following method.

First, toner particles as a measurement target are collected by suction, and a flat flow of the particles is formed. Thereafter, an instant flash of strobe light is emitted to the particles, and the particles are imaged as a still image. By using a flow-type particle image analyzer (FPIA-3000 manufactured by Sysmex Corporation) performing image analysis on the particle image, the average circularity is determined. The number of samplings for determining the average circularity is 3,500.

In a case where a toner contains external additives, the toner (developer) as a measurement target is dispersed in water containing a surfactant, then the dispersion is treated with ultrasonic waves such that the external additives are removed, and the toner particles are collected.

Number-Average Molecular Weight of Tetrahydrofuran-Soluble Components

The number-average molecular weight of the tetrahydrofuran-soluble components in the toner particles is, for example, more preferably 5,000 or more and 15,000 or less. Hereinafter, the tetrahydrofuran-soluble components are also referred to as "THF-soluble components".

In a case where the number-average molecular weight of the THF-soluble components in the toner particles is 5,000 or more and 15,000 or less, the change in loss tangent with respect to the change in strain is small, and even in a highly viscous elastic toner in which the extent of deformation is suppressed, a high fixability is obtained. Specifically, by setting the number-average molecular weight of the THF-soluble components to the above-described range, compared to a case of being too small, due to the large amount of low-molecular-weight components in the toner particles, the extent of deformation of the toner particles increases under a high-temperature and a high-pressure fixing condition, so that an increase in difference in glossiness is suppressed. In addition, by setting the number-average molecular weight of the THF-soluble components to the above-described range, compared to a case of being too large, due to the large amount of high-molecular-weight components in the toner particles, the extent of deformation of the toner particles is suppressed, and the difficulty in obtaining low-temperature fixability is suppressed. The number-average molecular weight of the THF-soluble components is, for example, even more preferably 7,000 or more and 10,000 or less.

The number-average molecular weight of the THF-soluble components in the above-described toner particles is measured by preparing THF-soluble components of the toner particles using two "HLC-8120GPC, SC-8020 (6.0 mmID×15 cm, manufactured by Tosoh Corporation)" and tetrahydrofuran (THF) as an eluent.

Specifically, 0.5 mg of the toner particles to be measured are dissolved in 1 g of THE, and after ultrasonic dispersion is applied, a sample is produced by adjusting a concentration to 0.5% by mass.

The measurement is performed using an RI detector under the conditions of a sample concentration of 0.5% by mass, a flow rate of 0.6 ml/min, a sample injection amount of 10 μl, and a measurement temperature of 40° C.

In addition, a calibration curve is created from 10 samples of "Polystyrene standard sample TSK standard" manufactured by Tosoh Corporation: "A-500", "F-1", "F-10", "F-80", "F-380", "A-2500", "F-4", "F-40", "F-128", and "F-700".

In a case of obtaining the toner particles from an externally added toner, for example, the toner is dispersed in an aqueous solution of 0.2% by mass of polyoxyethylene (10) octylphenyl ether so that the concentration is 10% by mass, and the external additive is liberated by applying ultrasonic vibration (frequency: 20 kHz, output: 30 W) for 60 minutes while maintaining a temperature or 30° C. or lower. The toner particles from which the external additive is removed are obtained by filtering out the toner particles from the obtained dispersion and washing the toner particles.

External Additive

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, CaO· $SiO_2$. $K_2O\cdot(TiO_2)_n$, $Al_2O_3\cdot 2SiO_2$, $CaCO_3$, $MgCO_3$, $BaSO_4$, and $MgSO_4$.

The surface of the inorganic particles as an external additive may have undergone, for example, a hydrophobic treatment. The hydrophobic treatment is performed, for example, by immersing the inorganic particles in a hydrophobic agent. The hydrophobic agent is not particularly limited, and examples thereof include a silane-based coupling agent, silicone oil, a titanate-based coupling agent, and an aluminum-based coupling agent. One kind of each of the agents may be used alone, or two or more kinds of the agents may be used in combination.

Usually, the amount of the hydrophobic agent is, for example, 1 part by mass or more and 10 parts by mass or less with respect to 100 parts by mass of the inorganic particles.

Examples of external additives also include resin particles (resin particles such as polystyrene, polymethylmethacrylate (PMMA), and melamine resins), a cleaning activator (for example, a metal salt of a higher fatty acid represented by zinc stearate or fluorine-based polymer particles), and the like.

The amount of external additives externally added with respect to the toner particles is, for example, preferably 0.01% by mass or more and 5% by mass or less, and more preferably 0.01% by mass or more and 2.0% by mass or less.

Characteristics of Toner

Viscoelasticity of Toner

As described above, the toner according to the present exemplary embodiment is the specific toner. That is, all of D1 (90), D50 (90), D1 (150), and D50 (150) are 0.5 or more and 2.5 or less, the value of D50 (150)–D1 (150) is less than 1.5, and the value of D50 (90)–D1 (90) is less than 1.0.

The D1 (90) in the specific toner is 0.5 or more and 2.5 or less, and for example, is preferably 0.5 or more and 2.0 or less, more preferably 0.6 or more and 1.8 or less, even more preferably 0.8 or more and 1.6 or less, and particularly preferably 1.0 or more and 1.5 or less.

The D50 (90) in the specific toner is 0.5 or more and 2.5 or less, and for example, is preferably 0.5 or more and 2.0 or less, more preferably 0.6 or more and 1.8 or less, even more preferably 0.8 or more and 1.6 or less, and particularly preferably 1.1 or more and 1.6 or less.

The D1 (150) in the specific toner is 0.5 or more and 2.5 or less, and for example, is preferably 0.5 or more and 2.0 or less, more preferably 0.5 or more and 1.5 or less, even more preferably 0.55 or more and 1.0 or less, and particularly preferably 0.55 or more and 0.8 or less.

The D50 (150) in the specific toner is 0.5 or more and 2.5 or less, and for example, is preferably 0.8 or more and 2.2 or less, more preferably 1.0 or more and 2.0 or less, even more preferably 1.2 or more and 1.9 or less, and particularly preferably 1.4 or more and 1.7 or less.

In a case where all of D1 (90), D50 (90), D1 (150), and D50 (150) are within the above-described range, the fog of the image is suppressed compared to a case of being lower than or higher than the above-described range. In addition, in a case where all of D1 (90), D50 (90), D1 (150), and D50 (150) are within the above-described range, good fixability is obtained compared to a case of being lower than the above-described range, and the difference in glossiness conditions is reduced compared to a case of being more than the above-described range.

The value of D50 (150)–D1 (150) in the specific toner is less than 1.5, and for example, is preferably 1.2 or less and more preferably 1.0 or less. In a case where the value of D50 (150)–D1 (150) is within the above-described range, the difference in glossiness conditions is reduced compared to a case of being more than the above-described range. From the viewpoint of reducing the difference in glossiness conditions, for example, it is preferable that the value of D50 (150)–D1 (150) is smaller.

The lower limit of the value of D50 (150)–D1 (150) is not particularly limited.

The value of D50 (90)–D1 (90) in the specific toner is less than 1.0, and for example, is preferably less than 0.5, more preferably 0.4 or less, and even more preferably 0.3 or less. In a case where the value of D50 (90)–D1 (90) is within the above-described range, the difference in glossiness conditions is reduced compared to a case of being more than the above-described range. From the viewpoint of reducing the difference in glossiness conditions, for example, it is preferable that the value of D50 (90)–D1 (90) is smaller.

The lower limit of the value of D50 (90)–D1 (90) is not particularly limited.

For example, it is preferable that a storage elastic modulus G' of the toner is $1\times10^8$ Pa or more in a range of 30° C. or higher and 50° C. or lower, and that a temperature at which the storage elastic modulus G' reaches less than $1\times10^5$ Pa (that is, the specific elastic modulus reached temperature) is 65° C. or higher and 90° C. or lower. The toner having the storage elastic modulus G' satisfying the above-described conditions has a high elastic modulus at a low temperature and a low elastic modulus at a temperature of 65° C. or higher and 90° C. or lower. Therefore, in a case where the storage elastic modulus G' of the toner satisfies the above-described conditions, the toner is more easily melted by heating, and better fixability is obtained as compared with a case where the temperature at which the storage elastic modulus G' of the extra components reaches a value less than $1\times10^5$ Pa is higher than 90° C.

The storage elastic modulus G' of the toner at 30° C. or higher and 50° C. or lower is, for example, preferably $1\times10^8$ Pa or more, more preferably $1\times10^8$ Pa or more and $1\times10^9$ Pa or less, and even more preferably $2\times10^8$ Pa or more and $6\times10^8$ Pa or less.

In a case where the storage elastic modulus G' of the toner in a range of 30° C. or higher and 50° C. or lower is in the above range, the storage stability of the toner is further improved as compared with a case where the storage elastic modulus G' of the toner in a range of 30° C. or higher and 50° C. is lower than the above-described range, and better fixability is likely to be obtained as compared with a case where the storage elastic modulus G' of the toner in a range of 30° C. or higher and 50° C. is higher than the above-described range.

The specific elastic modulus reached temperature of the toner is, for example, preferably 65° C. or higher and 90° C. or lower, more preferably 70° C. or higher and 87° C. or lower, and even more preferably 75° C. or higher and 84° C. or lower.

In a case where the specific elastic modulus reached temperature of the toner is within the above-described range, the storage stability of the toner is further improved than in a case where the specific elastic modulus reached temperature of the extra component is lower than the above-described range, and the obtained fixability is likely to be better than in a case where the specific elastic modulus reached temperature of the toner is higher than the above-described range.

The storage elastic modulus G' and the specific elastic modulus reached temperature of the toner are determined as follows.

Specifically, by a press molding machine, a toner as a measurement target is molded into tablets at room temperature (25° C.), thereby producing a measurement sample. The obtained measurement sample is interposed between parallel plates having a diameter of 8 mm, and dynamic viscoelasticity is measured under the following conditions by raising the measurement temperature from 30° C. to 150° C. at 2° C./min at a strain of 0.1% to 100%. From each of the storage elastic modulus curve and the loss elastic modulus curve obtained by the measurement, the storage elastic modulus G' is determined.

Measurement Conditions

Measurement device: rheometer ARES-G2 (manufactured by TA Instruments)

Fixture: 8 mm parallel plates

Gap: adjusted to 3 mm

Frequency: 1 Hz

Manufacturing Method of Toner

Next, the manufacturing method of the toner according to the present exemplary embodiment will be described.

The toner according to the present exemplary embodiment is obtained by manufacturing toner particles and then adding external additives to the exterior of the toner particles as necessary.

The toner particles may be manufactured by any of a dry manufacturing method (for example, a kneading and pulverizing method or the like) or a wet manufacturing method (for example, an aggregation and coalescence method, a suspension polymerization method, a dissolution suspension method, or the like). The manufacturing method of the toner particles is not particularly limited to these manufacturing methods, and a well-known manufacturing method is adopted.

Among the above methods, for example, the aggregation and coalescence method may be used for obtaining toner particles.

Specifically, in a case where the toner particles are manufactured by the aggregation and coalescence method, for example, the toner particles are manufactured through a step of preparing a resin particle dispersion in which resin particles to be the binder resin are dispersed and a specific resin particle dispersion to be the specific resin particles (a resin particle dispersion-preparing step), a step of allowing the resin particles (and other particles as necessary) to be aggregated in the resin particle dispersion (in the dispersion after mixing other particle dispersions as necessary) so as to form aggregated particles (aggregated particle-forming step), and a step of heating an aggregated particle dispersion in which the aggregated particles are dispersed to allow the aggregated particles to undergo coalescence and to form toner particles (coalescence step).

Hereinafter, each of the steps will be specifically described.

In the following section, a method for obtaining toner particles containing a colorant and a release agent will be described. The colorant and the release agent are used as necessary. Naturally, other additives different from the colorant and the release agent may also be used.

Resin Particle Dispersion-Preparing Step

First, for example, a colorant particle dispersion in which colorant particles are dispersed and a release agent particle dispersion in which release agent particles are dispersed are prepared together with the resin particle dispersion in which resin particles to be a binder resin are dispersed.

The resin particle dispersion is prepared, for example, by dispersing the resin particles in a dispersion medium by using a surfactant.

Examples of the dispersion medium used for the resin particle dispersion include an aqueous medium.

Examples of the aqueous medium include distilled water, water such as deionized water, alcohols, and the like. One kind of each of the media may be used alone, or two or more kinds of the media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, an anionic surfactant and a cationic surfactant are particularly mentioned. The nonionic surfactant may be used in combination with an anionic surfactant or a cationic surfactant.

One kind of surfactant may be used alone, or two or more kinds of surfactants may be used in combination.

As for the resin particle dispersion, examples of the method for dispersing the resin particles in the dispersion medium include general dispersion methods such as a rotary shearing homogenizer, a ball mill having media, a sand mill, and a dyno mill. Depending on the type of resin particles, the resin particles may be dispersed in the resin particle dispersion by using, for example, a transitional phase inversion emulsification method.

The transitional phase inversion emulsification method is a method of dissolving a resin to be dispersed in a hydrophobic organic solvent in which the resin is soluble, adding a base to an organic continuous phase (O phase) for causing neutralization, and then adding an aqueous medium (W phase), such that the resin undergoes conversion (so-called phase inversion) from W/O to O/W, turns into a discontinuous phase, and is dispersed in the aqueous medium in the form of particles.

The volume-average particle size of the resin particles dispersed in the resin particle dispersion is, for example, preferably 0.01 μm or more and 1 μm or less, more preferably 0.08 μm or more and 0.8 μm or less, and even more preferably 0.1 μm or more and 0.6 μm or less.

For determining the volume-average particle size of the resin particles, a particle size distribution is measured using a laser diffraction type particle size distribution analyzer (for example, LA-700 manufactured by HORIBA, Ltd.), a volume-based cumulative distribution from small-sized particles is drawn for the particle size range (channel) divided using the particle size distribution, and the particle size of particles accounting for cumulative 50% of all particles is measured as a volume-average particle size D50v. For particles in other dispersions, the volume-average particle size is measured in the same manner.

The content of the resin particles contained in the resin particle dispersion is, for example, preferably 5% by mass or more and 50% by mass or less, and more preferably 10% by mass or more and 40% by mass or less.

For example, a colorant particle dispersion and a release agent particle dispersion are prepared in the same manner as that adopted for preparing the resin particle dispersion. That is, the volume-average particle size of the resin particles, the dispersion medium, the dispersion method, and the content of the resin particles in the resin particle dispersion are also applied to the colorant particles to be dispersed in the colorant particle dispersion and the release agent particles to be dispersed in the release agent particle dispersion.

Preparation of Specific Resin Particle Dispersion

As a method for preparing the specific resin particle dispersion, for example, known methods such as an emulsion polymerization method, a melt-kneading method using a Banbury mixer or a kneader, a suspension polymerization method, and a spray drying method are used. Among these, for example, an emulsion polymerization method is preferable.

From the viewpoint of maintaining the storage elastic modulus G' and the loss tangent tanδ of the specific resin particles within the preferred range, for example, it is preferable to use a styrene-based monomer and a (meth) acrylic acid-based monomer as monomers and carry out polymerization in the presence of a crosslinking agent.

Furthermore, in manufacturing the specific resin particles, for example, it is preferable to perform emulsion polymerization a plurality of times.

Hereinafter, a method for manufacturing the specific resin particles will be specifically described.

The method for preparing the specific resin particle dispersion preferably includes, for example,

- a step of obtaining an emulsion containing a monomer, a crosslinking agent, a surfactant, and water (emulsion preparation step),
- a step of adding a polymerization initiator to the emulsion and heating the emulsion so as to polymerize the monomer (first emulsion polymerization step), and
- a step of adding an emulsion containing a monomer and a crosslinking agent to a reaction solution obtained after the first emulsion polymerization step and heating the solution so as to polymerize the monomer (second emulsion polymerization step).

Emulsion Preparation Step

The emulsion preparation step is a step of obtaining an emulsion containing a monomer, a crosslinking agent, a surfactant, and water.

For example, it is preferable to obtain the emulsion by emulsifying a monomer, a crosslinking agent, a surfactant, and water by using an emulsifying machine.

Examples of the emulsifying machine include a rotary stirrer equipped with a propeller type, anchor type, paddle type, or turbine type stirring blade, a stationary mixer such as a static mixer, and a rotor and stator type emulsifying machine such as a homogenizer or Clare mix, a mill type emulsifying machine having grinding function, a high-pressure emulsifying machine such as a Manton-Gaulin-type pressure emulsifying machine, a high-pressure nozzle type emulsifying machine that causes cavitation under high pressure, a high-pressure impact-type emulsifying machine, such as a microfluidizer, that generates shearing force by causing collision of liquids under high pressure, an ultrasonic emulsifying machine that causes cavitation by using ultrasonic waves, and a membrane emulsifying machine that performs uniform emulsification through pores.

As the monomers, for example, it is preferable to use a styrene-based monomer and a (meth)acrylic acid-based monomer.

As the crosslinking agent, the aforementioned crosslinking agent is used.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. The nonionic surfactant may be used in combination with an anionic surfactant or a cationic surfactant. Among these surfactants, for example, an anionic surfactant is preferable. One kind of surfactant may be used alone, or two or more kinds of surfactants may be used in combination.

The emulsion may contain a chain transfer agent. The chain transfer agent is not particularly limited. As the chain transfer agent, a compound having a thiol component can be used. Specifically, for example, alkyl mercaptans such as hexyl mercaptan, heptyl mercaptan, octyl mercaptan, nonyl mercaptan, decyl mercaptan, and dodecyl mercaptan are preferable.

From the viewpoint of maintaining the storage elastic modulus G' and the loss tangent tanδ of the specific resin particles within the preferred range, a mass ratio of the styrene-based monomer to the (meth)acrylic acid-based monomer in the emulsion (styrene-based monomer/(meth) acrylic acid-based monomer) is, for example, preferably 0.2 or more and 1.1 or less.

In addition, from the viewpoint of setting the storage elastic modulus G' and the loss tangent tanδ of the specific resin particles to be within, for example, the preferred ranges, a content of the crosslinking agent is, for example, preferably 0.5% by mass or more and 3% by mass or less with respect to the total mass of the emulsion.

First Emulsion Polymerization Step

This is a step of adding a polymerization initiator to the emulsion and heating the emulsion so as to polymerize the monomers.

Here, in the polymerization, for example, it is preferable to stir the emulsion (reaction solution) containing the polymerization initiator with a stirrer.

Examples of the stirrer include a rotary stirrer equipped with a propeller type, anchor type, paddle type, or turbine type stirring blade.

As the polymerization initiator, for example, it is preferable to use ammonium persulfate.

In a case where a polymerization initiator is used, the amount of the polymerization initiator added may be adjusted so that the viscoelasticity of the obtained specific resin particles is controlled. For example, by reducing the amount of the polymerization initiator added, it is easy to obtain resin particles having a high storage elastic modulus G'.

Second Emulsion Polymerization Step

The step is adding an emulsion containing a monomer to the reaction solution obtained after the first emulsion polymerization step, and heating to polymerize the monomer.

In the polymerization, for example, it is preferable to stir the reaction solution in the same manner as in the first emulsion polymerization step.

In this step, the time required for adding the emulsion containing the monomers may be adjusted so that the viscoelasticity of the obtained specific resin particles is controlled. For example, by increasing the time required for adding the emulsion containing the monomer, it is easy to obtain resin particles having a high storage elastic modulus G'. The time required for adding the emulsion containing the monomer is, for example, in a range of 2 hours or more and 5 hours or less.

Furthermore, in this step, the temperature at which the reaction solution is stirred may be adjusted so that the viscoelasticity of the obtained specific resin particles is controlled. For example, by reducing the temperature at which the reaction solution is stirred, it is easy to obtain resin particles having a high storage elastic modulus G'. The temperature at which the reaction solution is stirred is, for example, in a range of 55° C. or higher and 75° C. or lower.

For example, it is preferable to obtain the emulsion containing monomers by emulsifying monomers, a surfactant, and water by using an emulsifying machine.

Aggregated Particle-Forming Step

Next, the colorant particle dispersion, the release agent particle dispersion, and the specific resin particle dispersion are mixed together with the resin particle dispersion.

Thereafter, in the mixed dispersion, the resin particles, the colorant particles, the release agent particles, and the specific resin particles are hetero-aggregated such that aggregated particles are formed which have a diameter close to the diameter of the target toner particles and include the resin particles, the colorant particles, the release agent particles, and the specific resin particles.

Specifically, for example, an aggregating agent is added to the mixed dispersion, the pH of the mixed dispersion is adjusted such that the dispersion is acidic (for example, pH of 2 or higher and 5 or lower), and a dispersion stabilizer is added thereto as necessary. Thereafter, the dispersion is heated to a temperature of the glass transition temperature of the resin particles (specifically, for example, to a temperature equal to or higher than the glass transition temperature of the resin particles−30° C. and equal to or lower than the glass transition temperature of the resin particles−10° C.) such that the particles dispersed in the mixed dispersion are aggregated, thereby forming aggregated particles.

In the aggregated particle-forming step, for example, in a state where the mixed dispersion is stirred with a rotary shearing homogenizer, the aggregating agent may be added thereto at room temperature (for example, 25° C.), the pH of the mixed dispersion may be adjusted such that the dispersion is acidic (for example, pH of 2 or higher and 5 or lower), a dispersion stabilizer may be added to the dispersion as necessary, and then the dispersion may be heated.

In this step, by adjusting the temperature of the mixed dispersion in a case of adding the aggregating agent, the dispersion state of the specific resin particles in the obtained toner particles may be controlled. For example, by reducing the temperature of the mixed dispersion, the dispersibility of the specific resin particles is good. The temperature of the mixed dispersion is, for example, in a range of 5° C. or higher and 40° C. or lower.

In addition, in this step, by adjusting the stirring rate after adding the aggregating agent, the dispersion state of the specific resin particles in the obtained toner particles may be controlled. For example, by increasing the stirring rate after adding the aggregating agent, the dispersibility of the specific resin particles is good.

Examples of the aggregating agent include a surfactant having polarity opposite to the polarity of the surfactant used as a dispersant added to the mixed dispersion, an inorganic metal salt, and a metal complex having a valency of 2 or higher. In particular, in a case where a metal complex is used as the aggregating agent, the amount of the surfactant used is reduced, and the charging characteristics are improved.

An additive that forms a complex or a bond similar to the complex with a metal ion of the aggregating agent may be used as necessary. As such an additive, a chelating agent is used.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

As the chelating agent, a water-soluble chelating agent may also be used. Examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA).

The amount of the chelating agent added with respect to 100 parts by mass of resin particles is, for example, preferably 0.01 parts by mass or more and 5.0 parts by mass or less, and more preferably 0.1 parts by mass or more and less than 3.0 parts by mass.

Coalescence Step

The aggregated particle dispersion in which the aggregated particles are dispersed is then heated to, for example, a temperature equal to or higher than the glass transition temperature of the resin particles (for example, a temperature higher than the glass transition temperature of the resin particles by 10° C. to 30° C.) such that the aggregated particles coalesce, thereby forming toner particles.

Toner particles are obtained through the above steps.

The toner particles may be manufactured through a step of obtaining an aggregated particle dispersion in which the aggregated particles are dispersed, then mixing the aggregated particle dispersion with a resin particle dispersion in which resin particles are dispersed and the specific resin particle dispersion in which the specific resin particles are dispersed so as to cause the resin particles and the specific resin particles to be aggregated and adhere to the surface of the aggregated particles and to form second aggregated particles, and a step of heating a second aggregated particle dispersion in which the second aggregated particles are dispersed so as to cause the second aggregated particles to be coalesced and coalesce and to form toner particles having a core/shell structure.

In the step of forming second aggregated particles, the addition of the resin particle dispersion and the specific resin particle dispersion and the adhesion of the resin particles and the specific resin particles to the surface of the aggregated particles may be repeated a plurality of times. In a case where the operations are repeated a plurality of times, toner particles are obtained in which the specific resin particles are evenly incorporated into both the surface region and the central region of the toner particles.

After the coalescence step, the toner particles formed in a solution undergo a known washing step, solid-liquid separation step, and drying step, thereby obtaining dry toner particles.

The washing step is not particularly limited. However, in view of charging properties, displacement washing may be thoroughly performed using deionized water. The solid-liquid separation step is not particularly limited. However, in view of productivity, suction filtration, pressure filtration, or the like may be performed. Furthermore, the method of the drying step is not particularly limited. However, in view of productivity, freeze drying, flush drying, fluidized drying, vibratory fluidized drying, or the like may be performed.

For example, by adding an external additive to the obtained dry toner particles and mixing the external additive and the toner particles together, the toner according to the present exemplary embodiment is manufactured. The mixing may be performed, for example, using a V blender, a Henschel mixer, a Lödige mixer, or the like. Furthermore, coarse particles of the toner may be removed as necessary by using a vibratory sieving machine, a pneumatic sieving machine, or the like.

Carrier

The carrier includes magnetic particles and a resin layer that adheres to a surface of the magnetic particles.

Magnetic Particles

In the present exemplary embodiment, the average unevenness interval Sm of the surface of the magnetic particles satisfies 0.5 μm≤ Sm≤2.5 μm.

In a case where the average unevenness interval Sm of the surface of the magnetic particles is within the above-described range, compared to a case of being lower than the above-described range, it is presumed that the unevenness on the surface of the carrier is likely to be moderately caught by the toner, thereby suppressing the fog of the image. In addition, in a case where the average unevenness interval Sm is within the above-described range, compared to a case of being higher than the above-described range, it is presumed that the unevenness on the surface of the carrier is likely to be caught by the toner, thereby suppressing the fog of the image.

From the viewpoint of suppressing the fog of the image, Sm of the magnetic particles is, for example, preferably 0.8 μm or more and 2.5 μm or less, and more preferably 1.0 μm or more and 2.0 μm or less.

From the viewpoint of suppressing the fog of the image, for example, a relationship between the average unevenness interval Sm of the surface of the magnetic particles and the D1 (90) of the toner preferably satisfies the following expression (1'), more preferably satisfies the following expression (1), and even more preferably satisfies the following expression (1").

$$D1(90) - 0.5 \leq Sm \leq D1(90) + 1.25 \quad \text{Expression (1')}$$

$$D1(90) \leq Sm \leq D1(90) + 1.1 \quad \text{Expression (1)}$$

$$D1(90) + 0.05 \leq Sm \leq D1(90) + 1.05 \quad \text{Expression (1")}$$

A value of Sm-D1 (90) is, for example, preferably −0.5 or more and +1.3 or less, more preferably −0.5 or more and +1.25 or less, even more preferably 0 or more and +1.1 or less, particularly preferably +0.05 or more and +1.05 or less, and most preferably +0.4 or more and +0.6 or less.

The reason why the fog is suppressed in a case where the relationship between the D1 (90) of the toner and the average unevenness interval Sm of the magnetic particles in the carrier satisfies the above-described expressions is not clear, but is presumed as follows.

Specifically, a toner having a large D1 (90) has a higher viscosity on the surface of the toner than a toner having a small D1 (90). Therefore, by combining with a carrier including magnetic particles having a large average unevenness interval Sm, it is possible to prevent the unevenness on the surface of the carrier from biting into the surface of the toner too much. In a case where the unevenness of the surface of the carrier bites into the surface of the toner too much, it is considered that the entire developer is difficult to flow and the toner is easily deformed. In a case the unevenness on the surface of the carrier is prevented from biting into the surface of the toner too much, it is presumed that the fog of the image caused by the deformation of the toner due to the biting is suppressed.

In addition, a toner having a small D1 (90) has a higher elasticity on the surface of the toner than a toner having a large D1 (90). Therefore, by combining with a carrier including magnetic particles having a small average unevenness interval Sm, it is presumed that the unevenness on the surface of the carrier is likely to be caught by the surface of the toner, thereby suppressing the fog.

In the present exemplary embodiment, the arithmetic mean roughness Ra of the surface of the magnetic particles satisfies 0.3 μm≤ Ra≤1.2 μm.

In a case where the arithmetic mean roughness Ra of the surface of the magnetic particles is within the above-described range, compared to a case of being lower than the above-described range, it is presumed that the unevenness on the surface of the carrier is likely to be caught by the toner, thereby suppressing the fog of the image. In addition, in a case where the arithmetic mean roughness Ra is within the above-described range, compared to a case of being higher than the above-described range, it is presumed that the unevenness on the surface of the carrier is prevented from biting into the surface of the toner too much, and the fog of the image caused by the deformation of the toner due to the biting is suppressed.

From the viewpoint of suppressing the fog of the image, Ra of the magnetic particles is, for example, preferably 0.5 μm or more and 1.1 μm or less, and more preferably 0.7 μm or more and 1.0 μm or less.

From the viewpoint of suppressing the fog of the image, for example, a relationship between the arithmetic mean roughness Ra of the surface of the magnetic particles and the D1 (90) of the toner preferably satisfies the following expression (2'), more preferably satisfies the following expression (2), and even more preferably satisfies the following expression (2").

$$1.03 - 0.3 \times D1(90) \le Ra \le 1.45 - 0.3 \times D1(90) \quad \text{Expression (2')}$$

$$1.05 - 0.3 \times D1(90) \le Ra \le 1.36 - 0.3 \times D1(90) \quad \text{Expression (2)}$$

$$1.10 - 0.3 \times D1(90) \le Ra \le 1.25 - 0.3 \times D1(90) \quad \text{Expression (2'')}$$

A value of Ra+0.3×D1 (90) is, for example, preferably 0.75 or more and 1.55 or less, more preferably 1.03 or more and 1.45 or less, even more preferably 1.05 or more and 1.36 or less, particularly preferably 1.10 or more and 1.25 or less, and most preferably 1.10 or more and 1.20 or less.

In addition, from the viewpoint of further suppressing the fog of the image, for example, a relationship between the arithmetic mean roughness Ra of the surface of the magnetic particles and the D50 (150) of the toner preferably satisfies the following expression (3'), more preferably satisfies the following expression (3), and even more preferably satisfies the following expression (3").

$$0.90 - 0.3 \times D50(150) \le Ra \le 1.45 - 0.3 \times D50(150) \quad \text{Expression (3')}$$

$$1.05 - 0.3 \times D50(150) \le Ra \le 1.36 - 0.3 \times D50(150) \quad \text{Expression (3)}$$

$$1.10 - 0.3 \times D50(150) \le Ra \le 1.25 - 0.3 \times D50(150). \quad \text{Expression (3'')}$$

A value of Ra+0.3×D50 (150) is, for example, preferably 0.75 or more and 1.56 or less, more preferably 0.90 or more and 1.45 or less, even more preferably 1.05 or more and 1.36 or less, and particularly preferably 1.10 or more and 1.25 or less.

The reason why the fog is suppressed by satisfying the above-described expressions is not clear, but is presumed as follows.

Specifically, as described above, a toner having a large D1 (90) has a higher viscosity on the surface of the toner than a toner having a small D1 (90). In addition, a toner having a large D50 (150) has a higher viscosity inside the toner than a toner having a small D50 (150). Therefore, by combining with a carrier including magnetic particles having a small arithmetic mean roughness Ra, it is possible to prevent the unevenness on the surface of the carrier from biting into the toner too much. In a case the unevenness on the surface of the carrier is prevented from biting into the toner too much, it is presumed that the fog of the image caused by the deformation of the toner due to the biting is suppressed.

In addition, a toner having a small D1 (90) has a higher elasticity on the surface of the toner than a toner having a large D1 (90). In addition, a toner having a small D50 (150) has a higher elasticity inside the toner than a toner having a large D50 (150). Therefore, by combining with a carrier including magnetic particles having a large arithmetic mean roughness Ra, it is presumed that the unevenness on the surface of the carrier is likely to be caught by the toner, thereby suppressing the fog of the image.

In the present exemplary embodiment, a volume-average particle size of the magnetic particles is, for example, preferably 26 μm or more and 34 μm or less.

In a case where the volume-average particle size of the surface of the magnetic particles is within the above-described range, compared to a case of being lower than the above-described range, it is presumed that the fog of the image is suppressed because fluidity of the developer is good and the effect of the toner being caught on the surface of the carrier can be easily obtained. In addition, in a case where the volume-average particle size of the surface of the magnetic particles is within the above-described range, compared to a case of being higher than the above-described range, it is presumed that the fog of the image is suppressed because the deformation or deterioration of the toner is suppressed and the effect of the toner being caught on the surface of the carrier can be easily obtained.

From the viewpoint of suppressing the fog of the image, the volume-average particle size of the magnetic particles is, for example, more preferably 26 μm or more and 34 μm or less, and even more preferably 28 μm or more and 32 μm or less.

In the present exemplary embodiment, a BET specific surface area of the magnetic particles is, for example, preferably 0.12 $m^2/g$ or more and 0.20 $m^2/g$ or less.

In a case where the BET specific surface area of the magnetic particles is within the above-described range, compared to a case of being lower than the above-described range, it is presumed that the unevenness on the surface of the carrier is likely to be caught by the toner, thereby suppressing the fog of the image. In addition, in a case where the BET specific surface area is within the above-described range, compared to a case of being higher than the above-described range, it is presumed that the unevenness on the surface of the carrier is prevented from biting into the surface of the toner too much, and the fog of the image caused by the deformation of the toner due to the biting is suppressed.

From the viewpoint of suppressing the fog of the image, the BET specific surface area of the magnetic particles is, for example, more preferably 0.14 $m^2/g$ or more and 0.19 $m^2/g$ or less, and even more preferably 0.15 $m^2/g$ or more and 0.18 $m^2/g$ or less.

As a material of the magnetic particles, a known material used as a core material of the carrier is applied.

Specific examples of the magnetic particles include particles of a magnetic metal such as iron, nickel, and cobalt; particles of a magnetic oxide such as ferrite and magnetite; resin-impregnated magnetic particles in which a porous magnetic powder is impregnated with a resin; and magnetic powder-dispersed resin particles in which a magnetic powder is dispersed in a resin. As the magnetic particles in the present exemplary embodiment, for example, ferrite particles are preferable.

The magnetic particles may contain an Si element. In particular, in a case where the magnetic particles are the ferrite particles, as will be described later, by adding an Si-containing component such as $SiO_2$ in the manufacturing process of the magnetic particles, it is easier to control the average unevenness interval Sm and the arithmetic mean roughness Ra of the surface of the magnetic particles within the above-described ranges.

Examples of a content of the Si element with respect to the entire magnetic particles include a range of 0% by mass or more and 1% by mass or less, and the content may be in a range of 0.1% by mass or more and 0.5% by mass or less, or in a range of 0.1% by mass or more and 0.3% by mass or less.

The magnetic particles may contain at least one of a Ca element or an Sr element. In particular, in a case where the magnetic particles are the ferrite particles, as will be described later, by adding at least one selected from the group consisting of a Ca-containing component such as $CaCO_3$ or an Sr-containing component such as $SrCO_3$ in the manufacturing process of the magnetic particles, it is easier to control the average unevenness interval Sm and the arithmetic mean roughness Ra of the surface of the magnetic particles within the above-described ranges.

Examples of a content of the Ca element with respect to the entire magnetic particles include a range of 0% by mass or more and 5% by mass or less, and the content may be a range of 0.1% by mass or more and 2% by mass or less, or a range of 0.5% by mass or more and 1.5% by mass or less.

Examples of a content of the Sr element with respect to the entire magnetic particles include a range of 0% by mass or more and 5% by mass or less, and the content may be in a range of 0.1% by mass or more and 2% by mass or less, or in a range of 0.5% by mass or more and 1.5% by mass or less.

As for a magnetic force of the magnetic particles, a saturation magnetization of the magnetic particles in a magnetic field of 3,000 Oe is, for example, preferably 50 emu/g or more, and more preferably 60 emu/g or more. The saturation magnetization is measured using a vibrating sample magnetometer VSMP10-15 (manufactured by TOEI INDUSTRY CO., LTD.). The measurement sample is packed in a cell having an inner diameter of 7 mm and a height of 5 mm and set in the aforementioned magnetometer. For the measurement, a magnetic field is applied and swept up to 3,000 Oe. Next, the applied magnetic field is reduced, and a hysteresis curve is created on recording paper. Saturation magnetization, residual magnetization, and coercive force are obtained from the data of the curve.

An electrical volume resistance (volume resistivity) of the magnetic particles is, for example, preferably $1\times10^5$ Ω·cm or more and $1\times10^9$ Ω·cm or less, and more preferably $1\times10^7$ Ω·cm or more and $1\times10^9$ Ω·cm or less.

The electrical volume resistance (22 cm) of the magnetic particles is measured as follows. A measurement target is placed flat on the surface of a circular jig on which a 20 $cm^2$ electrode plate is disposed, such that the measurement target has a thickness of approximately 1 mm or more and 3 mm or less and forms a layer. The above-described 20 $cm^2$ electrode plate is placed on the layer such that the layer is sandwiched between the electrode plates. In order to eliminate voids between measurement targets, a load of 4 kg is applied onto the electrode plates arranged on the layer, and then the thickness (cm) of the layer is measured. Both the upper and lower electrodes of the layer are connected to an electrometer and a high-voltage power supply device. A high voltage is applied to both electrodes such that an electric field of 103.8 V/cm is generated, and the current value (A) flowing at this time is read. The volume resistivity is measured in an environment at a temperature of 20° C. and a relative humidity of 50%. An expression for calculating the electrical volume resistance (22 cm) of the measurement target is as follows.

$$R = E\times 20/(I - I_0)/L$$

In the above expression, R represents an electrical volume resistance ((2 cm) of the measurement target, E represents an applied voltage (V), I represents a current value (A), $I_0$ represents a current value (A) at an applied voltage of 0 V, and L represents a thickness of the layer (cm). The coefficient of 20 represents an area ($cm^2$) of the electrode plate.

In addition, a volume resistance value of the magnetic particles is not particularly limited, but for example, the volume resistance value is preferably $1\times10^6$Ω or more and $1\times10^8$Ω or less under the condition of a measured electric field of 24,000 V/cm or less.

A method for producing the magnetic particles in the present exemplary embodiment is not particularly limited, and for example, the magnetic particles can be produced as follows.

Surface properties (that is, the average unevenness interval Sm, the arithmetic mean roughness Ra of the surface, the BET specific surface area, and the like) of the magnetic particles are adjusted to some extent by a temperature during firing and an oxygen concentration. However, it is difficult to control each of the Sm, Ra, and BET specific surface area that correlate with each other, while the purpose of firing is to change the structure of the magnetic particles to have magnetization.

The magnetic particles constituting the carrier according to the present exemplary embodiment can be produced by the following combinations (A) to (E).

(A) temporary firing is performed before main firing.

(B) pulverization is further performed, and granulation is performed from a slurry in which the pulverized particle size is adjusted.

(C) an Si-containing component such as $SiO_2$, an Sr-containing component such as $SrCo_3$, a Ca-containing component such as $CaCO_3$, or the like is used as a surface property adjusting agent.

(D) temperature and oxygen concentration are adjusted during main firing.

(E) the magnetic particles obtained by main firing are heated while flowing (post-heating).

A temporary firing is performed before main firing, and then the particles are pulverized to control the particle size. Granules are formed into a pulverized product having a target particle size, and the volume-average particle size is determined. The size of the basic grain boundary of the magnetic particles is controlled by the pulverized particle size after the temporary firing.

In addition, unevenness of the surface is controlled by, before the temporary firing, adding $SiO_2$, $SrCO_3$, $CaCO_3$, or the like as an additive. In a case where the Si-containing component such as $SiO_2$ is added, the area of the grain boundary is increased and Sm can be adjusted to be large. The addition of the Sr-containing component such as $SrCO_3$ has an effect of increasing Ra. The addition of the Ca-containing component such as $CaCO_3$ has an effect of increasing Sm.

As the additive, the Si-containing component and at least one selected from the group consisting of the Sr-containing component and the Ca-containing component may be used in combination. The surface properties of the magnetic particles may be finely adjusted by adding at least one selected from the group consisting of the Sr-containing component and the Ca-containing component, while approximately controlling the surface properties of the magnetic particles by the amount of the Si-containing component added.

Next, the main firing is performed, and the firing temperature and the oxygen concentration are adjusted to obtain ferrite with magnetization. The size of the entire grain boundary is adjusted according to the firing temperature and the oxygen concentration during the main firing. In the main firing, as the firing temperature is higher, Sm is likely to be large, and as the oxygen concentration is higher, Ra is likely to be large. In addition, the firing temperature and the oxygen concentration during the main firing have a strong influence on the resistance and the magnetization. As the temperature is higher and the oxygen concentration is lower, the magnetization is higher and the resistance is lower.

After the main firing is completed and the ferrite formation is performed, internal voids are reduced at a temperature at which the ferrite formation reaction does not occur (post-heating). As a result, target magnetic particles are obtained. In a case where the temperature is applied while flowing, since gap between the grain boundaries is small, the BET specific surface area can be lowered without much change in Sm and Ra.

Hereinafter, an example of the method of producing the magnetic particles according to the present exemplary embodiment will be described by showing specific materials and conditions, but the magnetic particles according to the present exemplary embodiment are not limited to the materials and numerical values described below.

For example, $Fe_2O_3$, $Mn(OH)_2$, and $Mg(OH)_2$ are mixed in a molar ratio of 2:0.8:0.2, and $SiO_2$ is added in an amount of 0.1% by mass of the total and mixed further.

Next, a dispersant and water are added thereto, and the mixture is mixed and pulverized with zirconia beads having a media diameter of 1 mm. After the water is dried, temporary firing is performed at a temperature of 900° C.

The temperature of the temporary firing is not limited to the above-described temperature, and examples thereof include a range of 800° C. or higher and 1200° C. or lower. In addition, examples of a time for the temporary firing include a range of 60 minutes or more and 180 minutes or less.

The above-described temporary fired product is mixed and pulverized with a wet ball mill together with a dispersant, water, and polyvinyl alcohol as a binder resin. The pulverization is stopped in a case where the pulverized particle size reaches 1.2 μm in volume-average particle size.

Next, the particles are granulated and dried with a spray dryer so that the particles have a volume-average particle size of 28 μm.

The temperature of the dried particles is set to 1240° C. in an electric furnace, and the main firing is performed while adjusting the oxygen concentration to 1% in a mixed gas of oxygen and nitrogen.

The temperature of the main firing is not limited to the above-described temperature, and examples thereof include a range of 1200° C. or higher and 1500° C. or lower. The oxygen concentration in the main firing is not limited to the above-described concentration, and examples thereof include a range of 0.1% or more and 5% or less. In addition, examples of a time for the main firing include a range of 60 minutes or more and 300 minutes or less.

After the main firing, ferrite particles having a volume-average particle size of 35 μm are obtained through a crushing step and a classification step. Furthermore, the particles are post-heated at 900° C. under the condition of 15 ppm with a rotary kiln.

The temperature of the post-heating after the main firing is not limited to the above-described temperature, and examples thereof include a range of 500° C. or higher and 1000° C. or lower. In addition, examples of a time for the post-heating after the main firing include a range of 30 minutes or more and 120 minutes or less.

The finished particles are subjected to a crushing step and a classification step again to obtain target magnetic particles of 26 μm.

Resin Layer

The resin layer is a layer that adheres to the surface of the magnetic particles and contains a resin. The resin layer may be a layer that coats at least a part of the surface of the magnetic particles. Hereinafter, the resin layer is also referred to as "resin coating layer".

Examples of the resin configuring the resin coating layer include a styrene acrylic acid copolymer; a polyolefin-based resin such as polyethylene or polypropylene; a polyvinyl-based or polyvinylidene-based resins such as polystyrene, an acrylic resin, polyacrylonitrile, polyvinyl acetate, polyvinyl alcohol, polyvinyl butyral, polyvinyl chloride, polyvinylcarbazole, polyvinyl ether, or polyvinyl ketone; a vinyl chloride vinyl acetate copolymer; a straight silicone resin consisting of an organosiloxane bond or a modified product thereof; a fluororesin such as polytetrafluoroethylene, polyvinyl fluoride, polyvinylidene fluoride, or polychlorotrifluoroethylene; polyester; polyurethane; polycarbonate; an amino resin such as a urea formaldehyde resin; and an epoxy resin.

Among the resins, as the resin configuring the resin coating layer, from the viewpoint of charging properties and external additive adhesion controllability, for example, it is preferable to contain an acrylic resin, it is more preferable to contain an acrylic resin in an amount of 50% by mass or more with respect to the total mass of resins in the resin coating layer, and it is particularly preferable to contain an acrylic resin in an amount of 80% by mass or more with respect to the total mass of resins in the resin coating layer.

From the viewpoint of suppressing electrification fluctuations due to temperature and humidity, for example, the resin coating layer preferably contains an acrylic resin having an alicyclic structure. As a polymerization component of the acrylic resin having an alicyclic structure, for example, a lower alkyl ester of (meth)acrylic acid (for example, a (meth)acrylic acid alkyl ester having an alkyl group having 1 or more and 9 or less carbon atoms) is preferable, and specific examples thereof include methyl (meth)acrylate, ethyl (meth)acrylate, propyl (meth)acrylate, butyl (meth) acrylate, hexyl (meth)acrylate, cyclohexyl (meth)acrylate, and 2-ethylhexyl (meth)acrylate. The monomers may be used alone or in combination of two or more.

For example, the acrylic resin having an alicyclic structure preferably includes, as the polymerization component, cyclohexyl (meth)acrylate. With respect to the total mass of the acrylic resin having an alicyclic structure, a content of a monomer unit derived from the cyclohexyl (meth)acrylate included in the acrylic resin having an alicyclic structure is, for example, preferably 75% by mass or more and 100% by mass or less, more preferably 85% by mass or more and 100% by mass or less, and even more preferably 95% by mass or more and 100% by mass or less.

A weight-average molecular weight of the resin contained in the resin coating layer is, for example, preferably less than 300,000, more preferably less than 250,000, even more preferably 5,000 or more and less than 250,000, and particularly preferably 10,000 or more and 200,000 or less. Within the above-described range, for example, wetting with the magnetic particles is suitable, and there is an advantage that a resin coating layer having a uniform film thickness can be obtained.

For the purpose of controlling charging and resistance, the resin coating layer may contain conductive particles. Examples of the conductive particles include carbon black, metals such as gold, silver, and copper, and particles such as titanium oxide, zinc oxide, tin oxide, barium sulfate, aluminum borate, and potassium titanate.

Examples of a method of forming the resin coating layer on the surface of the magnetic particles include a wet manufacturing method and a dry manufacturing method. The wet manufacturing method is a manufacturing method using a solvent that dissolves or disperses the resin configuring the resin coating layer. On the other hand, the dry manufacturing method is a manufacturing method that does not use the above-described solvent.

Specifically, examples of the wet manufacturing method include an immersion method of immersing the magnetic particles in a resin solution for forming a resin coating layer; a spray method of spraying the resin solution for forming a resin coating layer to the surface of the magnetic particles; a fluidized bed method of spraying the resin solution for forming a resin coating layer to the magnetic particles that are in a state of being fluidized in a fluidized bed; and a kneader coater method of mixing the magnetic particles with the resin solution for forming a resin coating layer in a kneader coater and removing solvents. The manufacturing methods may be repeated or combined.

The resin solution for forming the resin coating layer used in the wet manufacturing method is prepared by dissolving or dispersing a resin and other components in a solvent. The solvent is not particularly limited, and for example, aromatic hydrocarbons such as toluene and xylene; ketones such as acetone and methyl ethyl ketone; ethers such as tetrahydrofuran and dioxane; and the like are used.

Examples of the dry manufacturing method include a method of heating a mixture of the magnetic particles and a resin for forming a resin coating layer in a dry state to form the resin coating layer. Specifically, for example, the magnetic particles and the resin for forming a resin coating layer are mixed together in a gas phase and melted by heating to form the resin coating layer.

From the viewpoint of resistance change suppression against temperature and humidity, an average thickness of the resin coating layer is, for example, preferably 0.6 μm or more and 1.4 μm or less, more preferably 0.8 μm or more and 1.2 μm or less, and particularly preferably 0.8 μm or more and 1.1 μm or less.

The average thickness of the resin coating layer is obtained by the following method.

The carrier is embedded in an epoxy resin, and cut with a microtome to produce a carrier cross section. An SEM image obtained by imaging the carrier cross section with a scanning electron microscope (SEM) is incorporated into an image processing analysis apparatus, and image analysis is performed. A thickness (μm) of the resin coating layer is measured by randomly selecting 10 sites per one carrier particle, thicknesses of 100 carriers are further measured, and all thicknesses are arithmetically averaged to obtain a value as the average thickness (μm) of the resin coating layer.

Characteristics of Carrier

From the viewpoint of fluidity of the developer, a volume-average particle size of the carrier is, for example, preferably 25 μm or more and 36 μm or less, more preferably 26 μm or more and 35 μm or less, and particularly preferably 28 μm or more and 34 μm or less.

An exposed area ratio of the magnetic particles on the surface of the carrier is, for example, preferably 4% or more and 20% or less, more preferably 5% or more and 18% or less, and even more preferably 8% or more and 12% or less. In a case where the exposed area ratio of the magnetic particles on the surface of the carrier is within the above-described range, the fog of the image is further suppressed as compared with a case where the exposed area ratio of the magnetic particles is lower than the above-described range. The reason for this is not clear, but it is presumed that the toner charge is unlikely to leak. In addition, in a case where the exposed area ratio of the magnetic particles on the surface of the carrier is within the above-described range, the fog of the image is further suppressed as compared with a case where the exposed area ratio of the magnetic particles is higher than the above-described range. The reason for this is not clear, but it is presumed that the fluidity of the developer is good.

The exposed area ratio of the magnetic particles on the surface of the carrier can be controlled by the amount of the resin used for forming the resin coating layer, and as the amount of the resin relative to the amount of the magnetic particles is larger, the exposed area ratio is smaller.

A content of the resin coating layer with respect to 100 parts by mass of the magnetic particles is, for example, preferably in a range of 1.5 parts by mass or more and 5 parts by mass or less, more preferably in a range of 2 parts by mass or more and 4 parts by mass or less, and even more preferably in a range of 2.5 parts by mass or more and 3.5 parts by mass or less.

The exposed area ratio of the magnetic particles on the surface of the carrier is a value obtained by the following method.

A target carrier and magnetic particles obtained by removing the resin coating layer from the target carrier are prepared. Examples of a method of removing the resin coating layer from the carrier include a method of removing the resin coating layer by dissolving resin components with an organic solvent, and a method of removing the resin coating layer by heating the carrier to approximately 800° C. to eliminate the resin components. Using each of the carrier and the magnetic particles as measurement samples, an Fe concentration (atomic %) on the sample surface is quantified by XPS, and (Fe concentration of carrier)÷(Fe concentration of magnetic particles)×100 is calculated as the exposed area ratio (%) of the magnetic particles.

Mixing Ratio of Toner and Carrier

Examples of a mixing ratio (mass ratio) of the toner and the carrier in an initially filled developer that is a developer contained in the developing device include a range of 1 part by mass or more and 30 parts by mass or less of the toner with respect to 100 parts by mass of the carrier.

Examples of a mixing ratio (mass ratio) of the toner and the carrier in a replenishing developer that is a developer contained in the developer cartridge and replenished to the developing device include a range of more than 0 parts by mass and 20 parts by mass or less of the carrier with respect to 100 parts by mass of the toner.

Developer Cartridge, Process Cartridge, Image Forming Apparatus, and Image Forming Method Hereinafter, a developer cartridge, a process cartridge, an image forming apparatus, and an image forming method, in which the above-described developer is used, will be described.

The developer cartridge according to the present exemplary embodiment is not particularly limited as long as the developer cartridge contains the above-described developer as a replenishing developer, and is attachable to and detachable from the image forming apparatus.

The process cartridge according to the present exemplary embodiment may be a first process cartridge that includes a developer cartridge containing the above-described developer as a replenishing developer, or may be a second process cartridge that includes a developing device containing the above-described developer as an initially filled developer.

Examples of the first process cartridge include a process cartridge including the developer cartridge that contains the above-described developer as a replenishing developer, and including a developing device that contains a developer including the replenishing developer replenished from the developer cartridge and develops an electrostatic charge image formed on a surface of an image holder into a toner image by using the developer, in which the process cartridge is attachable to and detachable from the image forming apparatus.

Examples of the second process cartridge include a process cartridge including a developing device that contains the above-described developer as an initially filled developer and develops an electrostatic charge image formed on a surface of an image holder into a toner image by using the developer, in which the process cartridge is attachable to and detachable from the image forming apparatus.

The image forming apparatus according to the present exemplary embodiment may be a first image forming apparatus that includes a developer cartridge containing the above-described developer as a replenishing developer, or may be a second image forming apparatus that includes a developing device containing the above-described developer as an initially filled developer.

Examples of the first image forming apparatus include an image forming apparatus including a developer cartridge that contains the above-described developer as a replenishing developer, an image holder, a charging device that charges a surface of the image holder, an electrostatic charge image forming device that forms an electrostatic charge image on the charged surface of the image holder, a developing device that contains a developer including the replenishing developer replenished from the developer cartridge and develops an electrostatic charge image formed on a surface of an image holder into a toner image by using the developer, a transfer device that transfers the toner image formed on the surface of the image holder to a surface of a recording medium, and a fixing device that fixes the toner image transferred to the surface of the recording medium.

Examples of the second image forming apparatus include an image forming apparatus including an image holder, a charging device that charges a surface of the image holder, an electrostatic charge image forming device that forms an electrostatic charge image on the charged surface of the image holder, a developing device that contains the above-described developer as an initially filled developer and develops an electrostatic charge image formed on a surface of an image holder into a toner image by using the developer, a transfer device that transfers the toner image formed on the surface of the image holder to a surface of a recording medium, and a fixing device that fixes the toner image transferred to the surface of the recording medium.

The image forming method according to the present exemplary embodiment may be a first image forming method using the above-described developer as a replenishing developer, or may be a second image forming method using the above-described developer as an initially filled developer.

Examples of the first image forming method include an image forming method including a charging step of charging a surface of an image holder, an electrostatic charge image forming step of forming an electrostatic charge image on the charged surface of the image holder; a developing step of developing an electrostatic charge image formed on a surface of the image holder as a toner image by using a developer including a replenishing developer that is the above-described developer and is replenished from a developer cartridge, a transfer step of transferring the toner image formed on the surface of the image holder to a surface of a recording medium, and fixing the toner image transferred to the surface of the recording medium.

Examples of the second image forming method include an image forming method including a charging step of charging a surface of an image holder, an electrostatic charge image forming step of forming an electrostatic charge image on the charged surface of the image holder; a developing step of developing an electrostatic charge image formed on a surface of the image holder as a toner image by using an initially filled developer that is a developer contained in a developing device, a transfer step of transferring the toner image formed on the surface of the image holder to a surface of a recording medium, and fixing the toner image transferred to the surface of the recording medium.

An example of the image forming apparatus according to the present exemplary embodiment will be shown below, but the present invention is not limited thereto. Hereinafter, among the parts shown in the drawing, main parts will be described, and others will not be described.

First Image Forming Apparatus and First Image Forming Method

An example of the first image forming apparatus and the first image forming method will be described with reference to the drawing.

The image forming apparatus shown in FIG. 1 has a configuration adopting a trickle development method, in which the above-described developer contained in the developer cartridge as a replenishing developer is supplied to the developer containing container in the developing device by a developer supplying unit, and at least a part of the developer contained in the developer containing container is discharged by a developer discharging unit.

The image forming apparatus shown in FIG. 1 has a configuration adopting a reclaim method, in which a residual toner remaining on the surface of the image holder is collected by a cleaning device, and then returned to the developing device for reuse.

An image forming apparatus 100 includes an image holder 110 that rotates clockwise indicated by an arrow a in FIG. 1; a charging device 120 that is provided above the image holder 110 so as to face the image holder 110 and negatively charges a surface of the image holder 110; an electrostatic charge image forming device 130 that forms an electrostatic charge image by writing an image to be formed with the developer (toner) on the surface of the image holder 110 charged by the charging device 120; a developing device 140 that is provided downstream of the electrostatic charge image forming device 130 and adheres the toner to the electrostatic charge image formed by the electrostatic charge image forming device 130 to form a toner image on the surface of the image holder 110; an endless intermediate transfer belt 150 that runs in a direction indicated by an arrow b while being contact with the image holder 110 and transfers the toner image formed on the surface of the image holder 110; a neutralization device 160 that neutralizes the surface of the image holder 110 after the toner image has been transferred to the intermediate transfer belt 150 to facilitate removal of a residual toner remaining on the surface; a cleaning device 170 that removes and collects the residual toner on the surface of the image holder 110 as a residual toner removing unit; and a residual toner transporting unit 174 that transports the residual toner removed and collected by the cleaning device 170 and supplies the residual toner to the developing device 140.

The charging device 120, the electrostatic charge image forming device 130, the developing device 140, the intermediate transfer belt 150, the neutralization device 160, and the cleaning device 170 are arranged in a clockwise direction on a circumference surrounding the image holder 110.

The intermediate transfer belt 150 is held in a state of being tensioned by support rolls 150A and 150B, a back roll 150C, and a driving roll 150D from the inside, and is driven in the direction of the arrow b as the driving roll 150D rotates. At a position facing the image holder 110 inside the intermediate transfer belt 150, a primary transfer roll 151 is provided to positively charge the intermediate transfer belt 150 and adsorb the toner on the image holder 110 to an outer surface of the intermediate transfer belt 150. On the outer side below the intermediate transfer belt 150, a secondary transfer roll 152 that transfers the toner image formed on the intermediate transfer belt 150 onto a recording paper P by positively charging the recording paper P and pressing the recording paper P against the intermediate transfer belt 150 is provided facing the back roll 150C.

Further, below the intermediate transfer belt 150, a recording medium supplying device 153 that supplies the recording paper P to the secondary transfer roll 152, and a fixing device 180 that fixes the toner image while transporting the recording paper P on which the toner image is formed on the secondary transfer roll 152 are provided.

The recording medium supplying device 153 includes a pair of transfer rolls 153A, and an induction slope 153B that guides the recording paper P transported by the transfer rolls 153A toward the secondary transfer roll 152. On the other hand, the fixing device 180 includes a fixing roll 181 that is a pair of heat rolls and fixes the toner image by heating and pressing the recording paper Ponto which the toner image has been transferred by the secondary transfer roll 152, and a transporting conveyor 182 that transports the recording paper P toward the fixing roll 181.

The recording paper P is transported in a direction indicated by an arrow c by the recording medium supplying device 153, the secondary transfer roll 152, and the fixing device 180.

An intermediate transfer member cleaning device 154 that has a cleaning blade for removing the toner remaining on the intermediate transfer belt 150 after the toner image has been transferred to the recording paper P by the secondary transfer roll 152 is provided to be arranged to face the driving roll 150D with the intermediate transfer belt 150 interposed therebetween.

Hereinafter, the developing device 140 will be described in detail. The developing device 140 is disposed to face the image holder 110 in a developing region, and for example, includes a developer containing container 141 that contains a two-component developer containing a negative (−) charged toner and a positive (+) charged carrier. The developer containing container 141 includes a developer containing container main body 141A and a developer containing container cover 141B that closes an upper end of the developer containing container main body 141A.

The developer containing container main body 141A includes a developing roll chamber 142A containing a developing roll 142 inside the developer containing container main body 141A, and includes, adjacent to the developing roll chamber 142A, a first stirring chamber 143A and a second stirring chamber 144A adjacent to the first stirring chamber 143A. In addition, in the developing roll chamber 142A, a layer thickness restricting member 145 for restricting a layer thickness of the developer on the surface of the developing roll 142 at a time when the developer containing container cover 141B is mounted on the developer containing container main body 141A is provided.

The first stirring chamber 143A and the second stirring chamber 144A are partitioned by a partition wall 141C, and although not shown, the first stirring chamber 143A and the second stirring chamber 144A are communicated at both end parts in a longitudinal direction (longitudinal direction of the developing device) of the partition wall 141C. In addition, the first stirring chamber 143A and the second stirring chamber 144A constitute a circulation stirring chamber (143A+144A).

In the developing roll chamber 142A, the developing roll 142 is disposed to face the image holder 110. Although not shown, the developing roll 142 has a sleeve provided on an outer side of a magnetic roll (fixed magnet) having magnetism. The developer in the first stirring chamber 143A is adsorbed to the surface of the developing roll 142 by a magnetic force of the magnetic roll, and is transported to the developing region. In addition, a roll shaft of the developing roll 142 is rotatably supported by the developer containing container main body 141A. Here, the developing roll 142 and the image holder 110 rotate in opposite directions, and in the opposite portion, the developer adsorbed on the surface of the developing roll 142 is transported to the developing region in the same direction as a traveling direction of the image holder 110.

In addition, the sleeve of the developing roll 142 is connected to a bias power supply (not shown) so that a predetermined developing bias is applied (in the present exemplary embodiment, a bias in which an alternating current component (AC) is superimposed on a direct current component (DC) is applied so that an alternating electric field is applied to the developing region).

In the first stirring chamber 143A and the second stirring chamber 144A, a first stirring member 143 (stirring and transporting member) and a second stirring member 144 (stirring and transporting member) that transport the developer while stirring are arranged. The first stirring member 143 is configured by a first rotating shaft extending in an axial direction of the developing roll 142 and a stirring and transporting blade (projection portion) spirally fixed to an outer periphery of the rotating shaft. Similarly, the second stirring member 144 is also configured by a second rotating shaft and a stirring and transporting blade (projection portion). The stirring members are rotatably supported by the developer containing container main body 141A. The first stirring member 143 and the second stirring member 144 are arranged such that the developer in the first stirring chamber 143A and the second stirring chamber 144A is transported in the opposite directions by a rotation thereof.

One end of a developer supplying unit 146 for supplying the replenishing developer to the second stirring chamber 144A is connected to one end in the longitudinal direction of the second stirring chamber 144A, and the other end of the developer supplying unit 146 is connected to a developer cartridge 147 containing the replenishing developer. In addition, one end of a developer discharging unit 148 for discharging the contained developer is also connected to the one end in the longitudinal direction of the second stirring chamber 144A, and the other end of the developer discharging unit 148 is connected to a developer collecting container (not shown) for collecting the discharged developer.

As described above, the developing device 140 supplies the replenishing developer from the developer cartridge 147 to the developing device 140 (the second stirring chamber 144A) through the developer supplying unit 146, and discharges old developer to the developer discharging unit 148, that is, a trickle development method is adopted as the developing device 140. Specifically, in order to suppress deterioration of charging performance of the developer and extend the period of developer replacement, the trickle development method is a development method in which the replenishing developer (trickle developer) is gradually supplied into the developing device, and developing is performed while discharging excess deteriorated developer (that contains a large amount of deteriorated carrier).

Next, the cleaning device 170 will be described in detail. The cleaning device 170 includes a housing 171 and a cleaning blade 172 that is disposed to project from the housing 171. The cleaning blade 172 has a plate-like shape extending in an axial direction of a rotation axis of the image holder 110, and is provided such that a leading end (edge portion) of the image holder 110 is in contact with a transfer position of the primary transfer roll 151 on the downstream side in the rotational direction (direction of arrow a), and is in contact with the downstream side in the rotational direction from the position where electricity is neutralized by a neutralization device 160.

In the cleaning blade 172, as the image holder 110 rotates in the direction of the arrow a, foreign matter such as the residual toner adhering to the image holder 110 without being transferred to the intermediate transfer belt 150 by the primary transfer roll 151 is dammed up and removed from the image holder 110.

In addition, a transporting member 173 is disposed at a bottom of the housing 171, and one end of the residual toner transporting unit 174 for transporting the residual toner (developer) removed by the cleaning blade 172 and connected, and supplying the residual toner to the developing device 140 is connected to the downstream side of the transporting member 173 in the transporting direction of the housing 171. The other end of the residual toner transporting unit 174 is connected to join the developer supplying unit 146.

As described above, the cleaning device 170 transports the residual toner to the developing device 140 (second stirring chamber 144A) through the residual toner transporting unit 174 as the transporting member 173 provided at the bottom of the housing 171 rotates, and stirs and transports the residual toner collected from the surface of the image holder 110 together with the developer (toner) contained in the developing device 140 for reuse.

In the reclaim type image forming apparatus according to the present exemplary embodiment, for example, a portion including the developer cartridge may be a cartridge structure (first process cartridge) attached to and detachable from the image forming apparatus. For example, it is suitable to use a process cartridge including the developer cartridge that contains the above-described developer as a replenishing developer, and a developing device that contains a developer including the replenishing developer replenished from the developer cartridge and develops an electrostatic charge image formed on a surface of an image holder into a toner image by using the developer, a developer supplying unit that supplies the replenishing developer contained in the developer cartridge to the developing device, and a developer discharging unit that discharges a part of the developer contained in the developing device, in which the process cartridge is attachable to and detachable from the image forming apparatus.

Second Image Forming Apparatus and Second Image Forming Method

An example of the second image forming apparatus and the second image forming method will be described with reference to the drawing.

Figure 2:
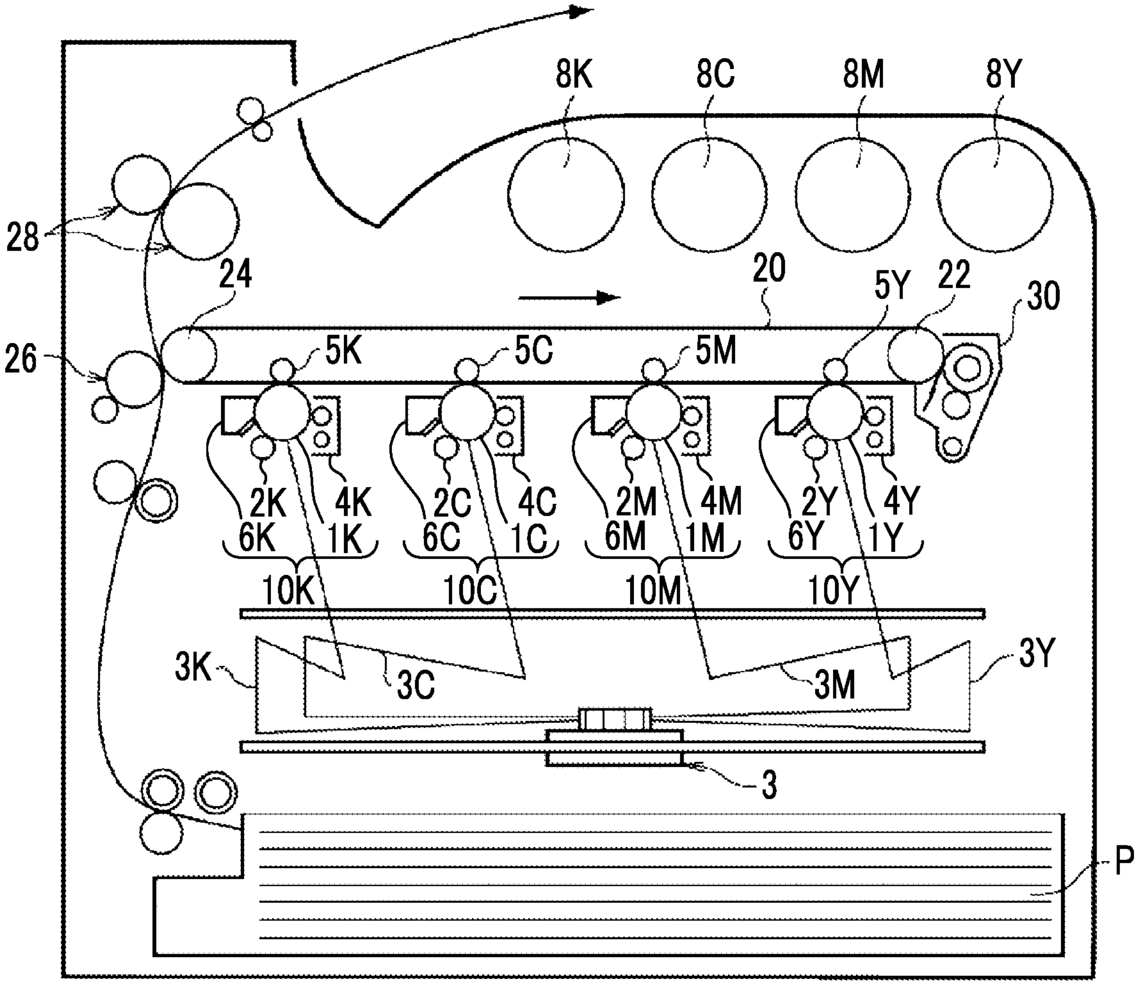
FIG. 2 is a view schematically showing a configuration of another example of the image forming apparatus according to the present exemplary embodiment.

The image forming apparatus shown in FIG. 2 includes first to fourth image forming units 10Y, 10M, 10C, and 10K adopting an electrophotographic method that output images of colors, yellow (Y), magenta (M), cyan (C), and black (K), based on color-separated image data. These image forming units (hereinafter, simply called "units" in some cases) 10Y, 10M, 10C, and 10K are arranged in a row in the horizontal direction in a state of being spaced apart by a predetermined distance. The units 10Y, 10M, 10C, and 10K may be process cartridges that are attached to and detachable from the image forming apparatus.

An intermediate transfer belt 20 as an intermediate transfer member passing through the units 10Y, 10M, 10C, and 10K extends above the units in the drawing. The intermediate transfer belt 20 is looped over a driving roll 22 and a support roll 24 which is in contact with the inner surface of the intermediate transfer belt 20, the rolls 22 and 24 being spaced apart in the horizontal direction in the drawing. The intermediate transfer belt 20 is designed to run in a direction toward the fourth unit 10K from the first unit 10Y. Force is applied to the support roll 24 in a direction away from the driving roll 22 by a spring or the like (not shown in the drawing). Tension is applied to the intermediate transfer belt 20 looped over the two rolls. An intermediate transfer member cleaning device 30 facing the driving roll 22 is provided on the image holding surface side of the intermediate transfer belt 20.

In addition, a toner including toners having four colors of yellow, magenta, cyan, and black, that are contained in containers of toner cartridges 8Y, 8M, 8C, and 8K, is supplied to developing devices 4Y, 4M, 4C, and 4K of the units 10Y, 10M, 10C, and 10K, respectively.

The first to fourth units 10Y, 10M, 10C, and 10K have the same configuration. Therefore, in the present specification, as a representative, the first unit 10Y will be described which is placed on the upstream side of the running direction of the intermediate transfer belt and forms a yellow image. Reference numerals marked with magenta (M), cyan (C), and black (K) instead of yellow (Y) are assigned in the same portions as in the first unit 10Y, such that the second to fourth units 10M, 10C, and 10K will not be described again.

The first unit 10Y has a photoreceptor 1Y that acts as an image holder. Around the photoreceptor 1Y, a charging roll (an example of the charging device) 2Y that charges the surface of the photoreceptor 1Y at a predetermined potential, an exposure device (an example of the electrostatic charge image forming device) 3 that exposes the charged surface to a laser beam 3Y based on color-separated image signals to form an electrostatic charge image, a developing device 4Y that develops the electrostatic charge image by supplying a charged toner to the electrostatic charge image, a primary transfer roll (an example of the primary transfer device) 5Y that transfers the developed toner image onto the intermediate transfer belt 20, and a photoreceptor cleaning device (an example of the cleaning device) 6Y that removes the residual toner on the surface of the photoreceptor 1Y after the primary transfer are arranged in this order.

The primary transfer roll 5Y is disposed on the inner side of the intermediate transfer belt 20, at a position facing the photoreceptor 1Y. Furthermore, a bias power supply (not shown in the drawing) for applying a primary transfer bias is connected to each of primary transfer rolls 5Y, 5M, 5C, and 5K. Each bias power supply varies the transfer bias applied to each primary transfer roll under the control of a control unit not shown in the drawing.

Hereinafter, the operation that the first unit 10Y carries out to form a yellow image will be described.

First, prior to the operation, the surface of the photoreceptor 1Y is charged to a potential of −600 V to −800 V by the charging roll 2Y.

The photoreceptor 1Y is formed of a photosensitive layer laminated on a conductive (for example, volume resistivity at 20° C.: $1\times10^{-6}$ Ω·cm or less) substrate. The photosensitive layer has properties in that although this layer usually has a high resistance (resistance of a general resin), in a case where the photosensitive layer is irradiated with the laser beam 3Y, the specific resistance of the portion irradiated with the laser beam changes. Therefore, via an exposure device 3, the laser beam 3Y is output to the surface of the charged photoreceptor 1Y according to the image data for yellow transmitted from the control unit not shown in the drawing. The laser beam 3Y is radiated to the photosensitive layer on the surface of the photoreceptor 1Y. As a result, an electrostatic charge image of a yellow image pattern is formed on the surface of the photoreceptor 1Y.

The electrostatic charge image is an image formed on the surface of the photoreceptor 1Y by charging. This image is a so-called negative latent image formed in a manner in which the charges with which the surface of the photoreceptor 1Y is charged flow due to the reduction in the specific resistance of the portion of the photosensitive layer irradiated with the laser beam 3Y, but the charges in a portion not being irradiated with the laser beam 3Y remain.

The electrostatic charge image formed on the photoreceptor 1Y rotates to a predetermined development position as the photoreceptor 1Y runs. At the development position, the electrostatic charge image on the photoreceptor 1Y turns into a visible image (developed image) as a toner image by the developing device 4Y.

The developing device 4Y contains, for example, an electrostatic charge image developer that contains at least a yellow toner and a carrier. By being agitated in the developing device 4Y, the yellow toner undergoes triboelectrification, carries charges of the same polarity (negative polarity) as the charges with which the surface of the photoreceptor 1Y is charged, and is held on a developer roll (an example of a developer holder). As the surface of the photoreceptor 1Y passes through the developing device 4Y, the yellow toner electrostatically adheres to the neutralized latent image portion on the surface of the photoreceptor 1Y, and the latent image is developed by the yellow toner. The photoreceptor 1Y on which the yellow toner image is formed keeps on running at a predetermined speed, and the toner image developed on the photoreceptor 1Y is transported to a predetermined primary transfer position.

In a case where the yellow toner image on the photoreceptor 1Y is transported to the primary transfer position, a primary transfer bias is applied to the primary transfer roll 5Y, and electrostatic force heading for the primary transfer roll 5Y from the photoreceptor 1Y acts on the toner image. As a result, the toner image on the photoreceptor 1Y is transferred onto the intermediate transfer belt 20. The transfer bias applied at this time has a polarity (+) opposite to the polarity (−) of the toner. For example, in the first unit 10Y, the transfer bias is set to +10 μA under the control of the control unit (not shown in the drawing).

On the other hand, the residual toner on the photoreceptor 1Y is removed by a photoreceptor cleaning device 6Y and collected.

In addition, the primary transfer bias applied to the primary transfer rolls 5M, 5C, and 5K following the second unit 10M is also controlled according to the first unit.

In this way, the intermediate transfer belt 20 to which the yellow toner image is transferred in the first unit 10Y is sequentially transported through the second to fourth units 10M, 10C, and 10K, and the toner images of each color are superimposed and transferred in layers.

The intermediate transfer belt 20, to which the toner images of four colors are transferred in layers through the first to fourth units, reaches a secondary transfer portion configured with the intermediate transfer belt 20, the support roll 24 in contact with the inner surface of the intermediate transfer belt, and a secondary transfer roll (an example of the secondary transfer device) 26 disposed on the image holding surface side of the intermediate transfer belt 20. On the other hand, via a supply mechanism, recording paper P (an example of recording medium) is supplied at a predetermined timing to the gap between the secondary transfer roll 26 and the intermediate transfer belt 20 that are in contact with each other. Furthermore, secondary transfer bias is applied to the support roll 24. The transfer bias applied at this time has the same polarity (−) as the polarity (−) of the toner. The electrostatic force heading for the recording paper P from the intermediate transfer belt 20 acts on the toner image, that makes the toner image on the intermediate transfer belt 20 transferred onto the recording paper P. The secondary transfer bias to be applied at this time is determined according to the resistance detected by a resistance detecting unit (not shown in the drawing) for detecting the resistance of the secondary transfer portion, and the voltage thereof is controlled.

Thereafter, the recording paper P is transported into a pressure contact portion (nip portion) of a pair of fixing rolls in the fixing device 28, the toner image is fixed to the surface of the recording paper P, and a fixed image is formed.

Examples of the recording paper P to which the toner image is to be transferred include plain paper used in electrophotographic copy machines, printers, and the like. Examples of the recording medium also include an OHP sheet, in addition to the recording paper P.

In order to further improve the smoothness of the image surface after fixing, for example, it is preferable that the surface of the recording paper P is also smooth. For example, coated paper prepared by coating the surface of plain paper with a resin or the like, art paper for printing, and the like are suitably used.

The recording paper P on which the colored image has been fixed is transported to an output portion, and a series of colored image forming operations is finished.

EXAMPLES

Examples will be described below, but the present invention is not limited to these examples. In the following description, unless otherwise specified, “parts” and “%” are based on mass in all cases.

Preparation of Specific Resin Particle Dispersion

Preparation of Specific Resin Particle Dispersion 1

- Styrene: 47.9 parts
- n-Butyl acrylate: 51.8 parts
- 2-Carboxyethyl acrylate: 0.3 parts
- Anionic surfactant (Dowfax2A1 manufactured by The Dow Chemical Company): 0.8 parts
- 1,10-Decanediol diacrylate: 1.65 parts The above-described raw materials are mixed together and dissolved, and 60 parts of deionized water is added thereto, followed by dispersion and emulsification in the flask, thereby producing an emulsion.

Subsequently, 1.3 parts of an anionic surfactant (DOWFAX 2A1 manufactured by The Dow Chemical Company) is dissolved in 90 parts of deionized water, 1 part of the above-described emulsion is added thereto, and 10 parts of deionized water in which 5.4 parts of ammonium persulfate is dissolved is further added thereto.

Thereafter, the rest of the emulsion is added thereto for 180 minutes, the flask is replaced with nitrogen by purging, the solution in the flask is heated up to 65° C. in an oil bath while being stirred, the emulsion polymerization is continued in the state for 500 hours, and then the solid content thereof is adjusted to 24.5% by mass, thereby obtaining a specific resin particle dispersion 1.

Results obtained by the above-described methods for the resin particles contained in the obtained specific resin particle dispersion 1 are as follows.

- Glass transition temperature Tg obtained from dynamic viscoelasticity measurement: 32.1° C.
- Minimum value of storage elastic modulus G' (p90-150): $2.6\times10^5$ Pa
- Maximum value of storage elastic modulus G' (p90-150): $5.1\times10^5$ Pa
- Minimum value of loss tangent tanδ in range of 30° C. or higher and 150° C. or lower: 0.028
- Maximum value of loss tangent tanδ in range of 30° C. or higher and 150° C. or lower: 2.35
- Minimum value of loss tangent tanδ in range of 65° C. or higher and 150° C. or lower: 0.028
- Maximum value of loss tangent tanδ in range of 65° C. or higher and 150° C. or lower: 0.203
- Number-average particle size: 153 nm
- SP value (S): 9.07

Preparation of Specific Resin Particle Dispersion 2

A specific resin particle dispersion 2 is obtained in the same manner as the specific resin particle dispersion 1 except, that the addition amount of styrene is changed to 54.5 parts, the addition amount of n-butyl acrylate is 44.6 parts, the addition amount of 2-carboxyethyl acrylate is changed to 0.84 parts, and the total addition amount of the anionic surfactant is changed to 1.26 parts.

Results obtained by the above-described methods for the resin particles contained in the obtained specific resin particle dispersion 2 are as follows.

- Glass transition temperature Tg obtained from dynamic viscoelasticity measurement: 44.3° C.
- Minimum value of storage elastic modulus G' (p90-150): $3.8\times10^5$ Pa
- Maximum value of storage elastic modulus G' (p90-150): $5.9\times10^5$ Pa
- Minimum value of loss tangent tanδ in range of 30° C. or higher and 150° C. or lower: 0.028
- Maximum value of loss tangent tanδ in range of 30° C. or higher and 150° C. or lower: 2.41
- Minimum value of loss tangent tanδ in range of 65° C. or higher and 150° C. or lower: 0.028
- Maximum value of loss tangent tanδ in range of 65° C. or higher and 150° C. or lower: 0.411
- Number-average particle size: 163 nm
- SP value (S): 9.09

Preparation of Toner

Preparation of Amorphous Resin Particle Dispersion 1

- Terephthalic acid: 28 parts
- Fumaric acid: 164 parts
- Adipic acid: 10 parts
- Ethylene oxide (2 mol) adduct of bisphenol A: 26 parts
- Propylene oxide (2 mol) adduct of bisphenol A: 542 parts The above-described materials are put in a reaction vessel equipped with a stirrer, a nitrogen introduction tube, a temperature sensor, and a rectifying column, the temperature is raised to 190° C. for 1 hour, and dibutyltin oxide is added to the mixture in an amount of 1.2 parts with respect to 100 parts of the above-described materials. While the generated water is distilled off, the temperature is raised to 240° C. for 6 hours, a dehydrocondensation reaction is continued for 3 hours in the reaction solution retained at 240° C., and then the reactant is cooled.

The reactant in a molten state is transferred to CAVITRON CD1010 (manufactured by Eurotech Ltd.) at a rate of 100 g/min. At the same time, separately prepared aqueous ammonia having a concentration of 0.37% by mass is transferred to CAVITRON CD1010 at a rate of 0.1 L/min in a state of being heated at 120° C. with a heat exchanger. The CAVITRON CD1010 is operated under the conditions of a rotation speed of a rotor of 60 Hz and a pressure of 5 kg/cm$^2$, thereby obtaining a resin particle dispersion in which resin particles of an amorphous polyester resin having a volume-average particle size of 169 nm are dispersed. Deionized water is added to the resin particle dispersion to adjust the solid content to 20% by mass, thereby obtaining an amorphous resin particle dispersion 1.

The SP value (R) of the obtained amorphous polyester resin is 9.41.

Preparation of Crystalline Resin Particle Dispersion

- 1,10-Dodecanedioic acid: 225 parts
- 1,6-Hexanediol: 143 parts

The above-described materials are put in a reaction vessel equipped with a stirrer, a nitrogen introduction tube, a temperature sensor, and a rectifying column, the temperature is raised to 160° C. for 1 hour, and 0.8 parts by mass of dibutyltin oxide is added to the mixture. While the generated water is distilled off, the temperature is raised to 180° C. for 6 hours, and a dehydrocondensation reaction is continued for 5 hours in the reaction solution retained at 180° C. Thereafter, the temperature is slowly raised to 230° C. under reduced pressure, and the reaction solution is stirred for 2 hours in a state of being retained at 230° C. Thereafter, the reactant is cooled. After cooling, solid-liquid separation is performed, and the solids are dried, thereby obtaining a crystalline polyester resin.

- Crystalline polyester resin: 100 parts
- Methyl ethyl ketone: 40 parts
- Isopropyl alcohol: 30 parts
- 10% aqueous ammonia solution: 6 parts The above-described materials are put in a 3 L jacketed reaction tank (manufactured by EYELA: BJ-30N) equipped with a condenser, a thermometer, a water dripping device, and an anchor blade. In a state where the reaction tank is kept at 80° C. in a water-circulation type thermostatic bath, and the materials are stirred and mixed together at 100 rpm, the resin is dissolved. Thereafter, the water-circulation type thermostatic bath is set to 50° C., and a total of 400 parts of deionized water retained at 50° C. is added dropwise to the reaction tank at a rate of 7 parts by mass/min to cause phase inversion, thereby obtaining an emulsion. 576 parts by mass of the obtained emulsion and 500 parts by mass of deionized water are put in a 2 L eggplant flask and set in an evaporator (manufactured by EYELA) equipped with a vacuum controlled unit via a trap ball. While being rotated, the eggplant flask is heated in a hot water bath at 60° C., and the pressure is reduced to 7 kPa with care to sudden boiling, thereby removing the solvent. The volume-average particle size D50v of the resin particles in the dispersion is 185 nm. Thereafter, deionized water is added thereto to obtain a crystalline resin particle dispersion having a solid content concentration of 22.1% by mass.

Preparation of Colorant Dispersion

- Cyan pigment (Pigment Blue 15:3 (copper phthalocyanine), manufactured by Dainichiseika Color & Chemicals Mfg. Co., Ltd.): 98 parts
- Anionic surfactant (TaycaPower manufactured by Tayca Corporation): 2 parts
- Deionized water: 420 parts The above-described components are mixed together, dissolved, and dispersed with a homogenizer (IKA ULTRA-TURRAX) for 10 minutes, thereby obtaining a colorant dispersion having a central particle size of 164 nm and a solid content of 21.1% by mass.

Preparation of Release Agent Dispersion

Synthetic wax (manufactured by NIPPON SEIRO CO., LTD., FNP92, melting temperature Tw: 92° C.): 50 parts Anionic surfactant (TaycaPower manufactured by Tayca Corporation): 1 part Deionized water: 200 parts The above-described materials are mixed together, heated to 130° C., and dispersed using a homogenizer (ULTRA-TURRAX T50 manufactured by IKA). Thereafter, using Manton-Gaulin high-pressure homogenizer (manufactured by Gaulin), dispersion treatment is performed, thereby obtaining a release agent dispersion (solid content: 20% by mass) in which release agent particles are dispersed.

The volume-average particle size of the release agent particles is 214 nm.

Preparation of Toner 1

Amorphous resin particle dispersion 1: 169 parts

Specific resin particle dispersion 1: 33 parts

Crystalline resin particle dispersion: 53 parts

Release agent dispersion: 25 parts

Colorant dispersion: 33 parts

Anionic surfactant (Dowfax2A1 manufactured by The Dow Chemical Company): 4.8 parts The above-described raw materials with a liquid temperature adjusted to 10° C. are put in a 3 L cylindrical stainless steel container, and dispersed and mixed together for 2 minutes in a state where a shearing force is applied at 4,000 rpm by a homogenizer (ULTRA-TURRAX T50 manufactured by IKA).

Next, 1.75 parts of a 10% aqueous nitric acid solution of aluminum sulfate as an aggregating agent is slowly added dropwise to the mixture, and dispersed and mixed for 10 minutes by the homogenizer at a rotation speed of 10,000 rpm, thereby obtaining a raw material dispersion.

Thereafter, the raw material dispersion is moved to a polymerization tank equipped with a stirrer using two paddles as stirring blades and a thermometer, and start to be heated with a mantle heater at a rotation speed for stirring of 550 rpm, and then the growth of aggregated particles is promoted at 40° C. In this case, by using 0.3 M nitric acid and a 1 M aqueous sodium hydroxide solution, the pH of the raw material dispersion is controlled in a range of 2.2 to 3.5. The raw material dispersion is retained in the above-described pH range for approximately 2 hours so that aggregated particles are formed.

Next, a dispersion prepared by mixing 21 parts of the amorphous resin particle dispersion 1 with 8 parts of the specific resin particle dispersion 1 is further added thereto, and the obtained dispersion is retained for 60 minutes so that the binder resin particles and the specific resin particles adhere to the surface of the aggregated particles. The dispersion is further heated to 53° C., 21 parts of the amorphous resin particle dispersion 1 is further added thereto, and the obtained dispersion is retained for 60 minutes so that the binder resin particles adhere to the surface of the aggregated particles.

Aggregated particles are prepared in a state where the size and shape of particles are checked using an optical microscope and MULTISIZER 3. Thereafter, pH is adjusted to 7.8 using a 5% aqueous sodium hydroxide solution, and the dispersion is retained for 15 minutes.

Thereafter, the pH is raised to 8.0 so that the aggregated particles are coalesced, and then the dispersion is heated up to 85° C. Two hours after the coalesce of the aggregated particles is confirmed using an optical microscope, heating is stopped, and the dispersion is cooled at a cooling rate of 1.0° C./min. Subsequently, the particles are sieved with a 20 μm mesh, repeatedly washed with water, and then dried in a vacuum dryer, thereby obtaining toner particles 1 having a volume-average particle size of 5.3 μm.

100 parts of the obtained toner particles and 0.7 parts of silica particles treated with dimethylsilicone oil (RY200 manufactured by Nippon Aerosil Co., Ltd.) are mixed together by a henschel mixer, thereby obtaining a toner 1.

Preparation of Toner 2

A toner 2 is obtained in the same manner as the toner 1, except that, instead of the specific resin particle dispersion 1, a specific resin particle dispersion of the type shown in Table 1 is used in such an amount that the content of the resin particles (that is, the specific resin particles) with respect to the total amount of the toner particles is the value shown in Table 1.

Preparation of Toner 3

A toner 3 is obtained in the same manner as the toner 1, except that the specific resin particle dispersion 1 is used in such an amount that the content of the specific resin particles with respect to the total amount of the toner particles is the value shown in Table 1, and the amount of the crystalline resin particle dispersion added is adjusted so that the content of the crystalline resin with respect to the total amount of the binder resin is the value shown in Table 1.

Preparation of Toner 4

A toner 4 is obtained in the same manner as the toner 1, except that the rotation speed of the homogenizer is changed from 10,000 rpm to 5,000 rpm.

Preparation of Toner 5

A toner 5 is obtained in the same manner as the toner 1, except that the specific resin particle dispersion 1 is used in such an amount that the content of the specific resin particles with respect to the total amount of the toner particles is the value shown in Table 1, and the pH during the coalesce of the aggregated particles is changed from 8.0 to 6.0.

Preparation of Toner 6

A toner 6 is obtained in the same manner as the toner 1, except that the pH during the coalesce of the aggregated particles is changed from 8.0 to 6.5, the temperature after heating is changed from 85° C. to 75° C., and 5.2 parts of the anionic surfactant (DOWFAX 2A1 manufactured by The Dow Chemical Company) is added at the time the temperature reaches 75° C.

Preparation of Toner C1

Amorphous resin particle dispersion 1: 169 parts

Specific resin particle dispersion 1: 41 parts

Crystalline resin particle dispersion: 53 parts

Release agent dispersion: 25 parts

Colorant dispersion: 33 parts

Anionic surfactant (Dowfax2A1 manufactured by The Dow Chemical Company): 4.8 parts The above-described raw materials with a liquid temperature adjusted to 30° C. are put in a 3 L cylindrical stainless steel container, and dispersed and mixed together for 2 minutes in a state where a shearing force is applied at 4,000 rpm by a homogenizer (ULTRA-TURRAX T50 manufactured by IKA).

Next, 1.75 parts of a 10% aqueous nitric acid solution of aluminum sulfate as an aggregating agent is slowly added dropwise to the mixture, and dispersed and mixed for 3 minutes by the homogenizer at a rotation speed of 4,000 rpm, thereby obtaining a raw material dispersion.

Thereafter, the raw material dispersion is moved to a polymerization tank equipped with a stirrer using two paddles as stirring blades and a thermometer, and start to be heated with a mantle heater at a rotation speed for stirring of 550 rpm, and then the growth of aggregated particles is promoted at 40° C. In this case, by using 0.3 M nitric acid and a 1 M aqueous sodium hydroxide solution, the pH of the raw material dispersion is controlled in a range of 2.2 to 3.5. The raw material dispersion is retained in the above-described pH range for approximately 2 hours so that aggregated particles are formed.

Next, 42 parts of the amorphous resin particle dispersion 1 is further added thereto, and the obtained dispersion is retained for 60 minutes so that the binder resin particles adhere to the surface of the aggregated particles.

Aggregated particles are prepared in a state where the size and shape of particles are checked using an optical microscope and MULTISIZER 3. Thereafter, pH is adjusted to 7.8 using a 5% aqueous sodium hydroxide solution, and the dispersion is retained for 15 minutes.

Thereafter, the pH is raised to 8.0 so that the aggregated particles are coalesced, and then the dispersion is heated up to 85° C. Two hours after the coalesce of the aggregated particles is confirmed using an optical microscope, heating is stopped, and the dispersion is cooled at a cooling rate of 1.0° C./min. Subsequently, the particles are sieved with a 20 μm mesh, repeatedly washed with water, and then dried in a vacuum dryer, thereby obtaining toner particles C1.

100 parts of the obtained toner particles and 0.7 parts of silica particles treated with dimethylsilicone oil (RY200 manufactured by Nippon Aerosil Co., Ltd.) are mixed together by a henschel mixer, thereby obtaining a toner C1.

Regarding the obtained toners, Table 1 shows the type of the specific resin particle dispersion ("Particle type" in the table), the content of the specific resin particles with respect to the total amount of the toner particles ("Particle content (%)" in the table), and the content of the crystalline resin with respect to the total amount of the binder resin ("Crystalline resin content (%)" in the table) in the obtained toner.

In addition, regarding the obtained toners, Table 1 also shows the ratio of the content of the crystalline resin to the content of the specific resin particles ("Crystalline content ratio vs particles" in the table) and the ratio of the content of the amorphous resin to the content of the specific resin particles ("Amorphous content ratio vs particles" in the table) in the obtained toner.

In addition, regarding the obtained toners, Table 1 also shows the volume-average particle size of the toner particles in the obtained toner.

Furthermore, Table 1 shows the storage elastic modulus G' of the extra components in a range of 30° C. or higher and 50° C. or lower ("30° C.-50° C. G'(Pa)" in the table), the specific elastic modulus reached temperature of the extra components ("Reached temperature (° C.)" in the table), and the loss tangent tanδ at the specific elastic modulus reached temperature ("Reached temperature tanδ" in the table), that are determined by the methods described above.

In addition, regarding the obtained toners, Table 2 shows D1 (90), D50 (90), D1 (150), D50 (150), the value of D50 (150)−D1 (150) ("Difference (150)" in the table), the value of D50 (90)−D1 (90) ("Difference (90)" in the table), the number-average molecular weight of the THF-soluble components in the toner particles ("Mn" in the table), the storage elastic modulus G' in a range of 30° C. or higher and 50° C. or lower ("30° C.-50° C. G'(Pa)" in the table), the specific clastic modulus reached temperature ("Reached temperature (° C.)" in the table), the value of log G'(190-150)−log G'(r90-150) ("Difference in viscoelasticity" in the table), and the difference (SP value (S)−SP value (R)) ("Difference in SP value" in the table), that are determined by the methods described above.

TABLE 1

| Toner | Particles Type | Particles Content (%) | Crystalline resin Content (%) | Crystalline content ratio vs particles | Amorphous content ratio vs particles | Toner particles Volume-average particle size (μm) | Extra component 30° C.-50° C. G'(Pa) | Extra component Reached temperature (° C.) | Extra component Reached temperature tanδ |
|---|---|---|---|---|---|---|---|---|---|
| 1 | 1 | 10 | 15 | 1.35 | 7.65 | 5.3 | $3.0 \times 10^8$-$5.3 \times 10^8$ | 72 | 1.4 |
| 2 | 2 | 10 | 15 | 1.35 | 7.65 | 4.5 | $3.0 \times 10^8$-$5.3 \times 10^8$ | 72 | 1.4 |
| 3 | 1 | 4 | 49 | 11.76 | 12.24 | 4.5 | $9.1 \times 10^7$-$2.3 \times 10^8$ | 69 | 1.52 |
| 4 | 1 | 10 | 15 | 1.35 | 7.65 | 4.9 | $3.0 \times 10^8$-$5.3 \times 10^8$ | 72 | 1.4 |
| 5 | 1 | 19 | 15 | 0.64 | 3.62 | 4.7 | $3.0 \times 10^8$-$5.3 \times 10^8$ | 75 | 0.92 |
| 6 | 1 | 10 | 15 | 0.26 | 1.45 | 5.0 | $3.0 \times 10^8$-$5.3 \times 10^8$ | 72 | 1.4 |
| C1 | 1 | 10 | 15 | 1.35 | 7.65 | 4.3 | $3.0 \times 10^8$-$5.3 \times 10^8$ | 72 | 1.4 |

TABLE 2

| Toner | D1 (90) | D50 (90) | D1 (150) | D50 (150) | Difference (150) | Difference (90) | Mn | 30° C.-50° C. G'(Pa) | Reached temperature (° C.) | Difference in viscoelasticity | Difference in SP value |
|---|---|---|---|---|---|---|---|---|---|---|---|
| 1 | 1.21 | 1.42 | 0.60 | 1.53 | 0.93 | 0.21 | 8891 | $2.5 \times 10^8$-$4.8 \times 10^8$ | 82 | 3.3 | −0.26 |
| 2 | 1.35 | 1.51 | 0.63 | 1.59 | 0.96 | 0.16 | 8351 | $2.7 \times 10^8$-$5.3 \times 10^8$ | 85 | 3.2 | −0.26 |
| 3 | 1.47 | 1.61 | 0.79 | 1.87 | 1.08 | 0.14 | 8192 | $1.3 \times 10^8$-$4.2 \times 10^8$ | 74 | 3.7 | −0.13 |
| 4 | 1.22 | 1.44 | 0.58 | 1.81 | 1.23 | 0.22 | 9834 | $2.5 \times 10^8$-$4.8 \times 10^8$ | 83 | 3.1 | −0.26 |
| 5 | 0.55 | 0.74 | 0.63 | 1.53 | 0.90 | 0.19 | 7815 | $2.2 \times 10^8$-$4.5 \times 10^8$ | 84 | 3.7 | −0.26 |

TABLE 2-continued

| Toner | D1 (90) | D50 (90) | D1 (150) | D50 (150) | Difference (150) | Difference (90) | Mn | 30° C.-50° C. G'(Pa) | Reached temperature (° C.) | Difference in viscoelasticity | Difference in SP value |
|---|---|---|---|---|---|---|---|---|---|---|---|
| 6 | 1.31 | 1.62 | 0.67 | 1.94 | 1.27 | 0.31 | 16892 | $2.9 \times 10^8$-$5.1 \times 10^8$ | 86 | 3.2 | −0.26 |
| C1 | 1.18 | 2.23 | 0.63 | 2.27 | 1.64 | 1.05 | 8209 | $2.9 \times 10^8$-$5.1 \times 10^8$ | 83 | 3.1 | −0.26 |

Production of Carrier

Production of Magnetic Particles 1

$Fe_2O_3$, $Mn(OH)_2$, $Mg(OH)_2$, $SiO_2$, $SrCO_3$, and $CaCO_3$ are mixed in the addition amounts shown in Table 3, and a dispersant, water, and zirconia beads having a media diameter of 1 mm are added thereto, and the mixture is crushed and mixed with a sand mill. After filtering the zirconia beads and drying, temporary firing is performed in a rotary kiln at 20 rpm and 900° C. to obtain a mixed oxide.

Next, the dispersant and water are added thereto, and 6.6 parts by mass of polyvinyl alcohol is further added thereto. Thereafter, pulverization is performed with a wet ball mill until the volume-average particle size (that is, crushed particle size of slurry pulverization) reaches the value shown in Table 3. Next, the particles are granulated and dried with a spray dryer so that the dry particle size has the value shown in Table 3. Further, the particles are main-fired in an electric furnace at a temperature of 1220° C. in an oxygen-nitrogen mixed atmosphere with an oxygen concentration of 1% for 5 hours. After undergoing a crushing step and a classification step of the obtained particles, the particles are heated in a rotary kiln at 15 rpm and 900° C. for 2 hours, and subjected to the same classification step, thereby obtaining magnetic particles 1. Table 4 shows the average unevenness interval Sm, the arithmetic mean roughness Ra, the volume-average particle size ("Particle size" in the table), and the BET specific surface area ("BET" in the table) of the obtained magnetic particles 1.

Production of Magnetic Particles 2 to 12 and C1 to C4

Magnetic particles 2 to 12 and C1 to C4 are produced in the same manner as the magnetic particles 1, except that the compositions and reaction conditions in Table 3 are changed, respectively. Table 4 shows each of the average unevenness interval Sm, the arithmetic mean roughness Ra, the volume-average particle size ("Particle size" in the table), and the BET specific surface area ("BET" in the table) of the obtained magnetic particles 2 to 12 and C1 to C4.

TABLE 3

| Magnetic particles | Raw material composition (part by mass) $Fe_2O_3$ | $Mn(OH)_2$ | $Mg(OH)_2$ | $SiO_2$ | $SrCO_3$ | $CaCO_2$ | Temporary firing Temperature (° C.) | Slurry pulverization Pulverized particle size (μm) | Granulation Dry particle size (μm) | Main firing Temperature (° C.) | Main firing $O_2$ (%) | Post-heating Temperature (° C.) |
|---|---|---|---|---|---|---|---|---|---|---|---|---|
| 1 | 1318 | 586 | 96 | 0.10 | 1.0 | 0 | 900 | 1.1 | 30 | 1240 | 1.0 | 800 |
| 2 | 1318 | 586 | 96 | 0 | 1.0 | 0 | 900 | 1.0 | 30 | 1220 | 1.0 | 800 |
| 3 | 1318 | 586 | 96 | 0.10 | 0 | 1.2 | 900 | 1.2 | 30 | 1240 | 0.9 | 800 |
| 4 | 1318 | 586 | 96 | 0.15 | 1.0 | 0 | 900 | 1.0 | 30 | 1220 | 1.1 | 800 |
| 5 | 1318 | 586 | 96 | 0.10 | 1.0 | 0 | 900 | 1.0 | 30 | 1230 | 1.1 | 800 |
| 6 | 1318 | 586 | 96 | 0.10 | 0 | 1.0 | 900 | 1.1 | 30 | 1230 | 1.1 | 800 |
| 7 | 1318 | 586 | 96 | 0.15 | 1.2 | 0 | 900 | 0.8 | 30 | 1240 | 1.0 | 800 |
| 8 | 1318 | 586 | 96 | 0.10 | 1.0 | 0 | 900 | 1.2 | 30 | 1230 | 1.0 | 800 |
| 9 | 1318 | 586 | 96 | 0.12 | 0 | 1.0 | 900 | 1.1 | 30 | 1240 | 1.0 | 800 |
| 10 | 1318 | 586 | 96 | 0.1 | 0 | 1.0 | 900 | 1.1 | 30 | 1240 | 1.0 | 800 |
| 11 | 1318 | 586 | 96 | 0 | 1.0 | 0 | 900 | 1.1 | 30 | 1230 | 1.0 | 800 |
| 12 | 1318 | 586 | 96 | 0.10 | 1.0 | 0 | 900 | 1.0 | 30 | 1240 | 1.0 | 800 |
| C1 | 1318 | 586 | 96 | 0.10 | 0 | 0.8 | 900 | 0.8 | 30 | 1220 | 0.9 | 820 |
| C2 | 1318 | 586 | 96 | 0 | 0 | 1.6 | 900 | 1.1 | 30 | 1245 | 1.1 | 820 |
| C3 | 1318 | 586 | 96 | 0.12 | 0 | 0 | 900 | 0.8 | 30 | 1235 | 1.0 | 800 |
| C4 | 1318 | 586 | 96 | 0 | 1.2 | 0 | 900 | 0.9 | 30 | 1245 | 1.1 | 800 |

Preparation of Coating Agent

Cyclohexyl methacrylate (weight-average molecular weight: 50,000): 30 parts Carbon black (VXC72 manufactured by Cabot Corporation.): 0.5 parts Toluene: 250 parts Isopropyl alcohol: 50 parts The above-described materials and glass beads (diameter 1 mm, the same amount as toluene) are put in a sand mill and stirred at a rotation speed of 190 rpm for 30 minutes, thereby obtaining a coating agent having a solid content of 9% by mass.

Production of Carriers 1 to 14 and C1 to C4 1,000 parts of the magnetic particles shown in Table 4 and the amounts of the above-described coating agent shown in Table 4 are added to a kneader, and mixed at room temperature (25° C.) for 20 minutes. Next, the mixture is heated to 70° C. and dried under reduced pressure.

Next, the dried product is taken out of the kneader, and sieved with a mesh having an opening size of 75 μm to remove coarse powder, thereby obtaining carriers 1 to 14 and C1 to C4. Regarding the obtained carriers, Table 4 also shows the average thickness of the resin layer and the exposed area ratio of the magnetic particles.

TABLE 4

| | Magnetic particles | | | | | Coating agent | Average thickness | Exposed area ratio of |
|---|---|---|---|---|---|---|---|---|
| Carrier | Type | Sm (μm) | Ra (μm) | Particle size (μm) | BET ($m^2/g$) | Addition amount (part) | of resin layer (μm) | magnetic particles (%) |
| 1 | 1 | 1.70 | 0.75 | 30 | 0.165 | 330 | 1.20 | 10 |
| 2 | 2 | 1.40 | 0.70 | 30 | 0.175 | 330 | 1.20 | 12 |
| 3 | 3 | 2.40 | 1.10 | 30 | 0.145 | 330 | 1.25 | 8 |
| 4 | 4 | 0.60 | 0.60 | 30 | 0.150 | 330 | 1.25 | 7 |
| 5 | 5 | 1.60 | 0.90 | 30 | 0.155 | 330 | 1.25 | 7 |
| 6 | 6 | 1.70 | 0.87 | 30 | 0.150 | 330 | 1.25 | 8 |
| 7 | 7 | 1.80 | 1.17 | 30 | 0.180 | 330 | 1.10 | 12 |
| 8 | 8 | 1.50 | 0.65 | 30 | 0.140 | 330 | 1.30 | 8 |
| 9 | 9 | 1.70 | 0.93 | 30 | 0.148 | 330 | 1.25 | 7 |
| 10 | 10 | 1.80 | 0.90 | 30 | 0.152 | 330 | 1.25 | 8 |
| 11 | 11 | 1.50 | 0.68 | 30 | 0.141 | 330 | 1.30 | 7 |
| 12 | 12 | 1.70 | 0.81 | 30 | 0.180 | 330 | 1.10 | 8 |
| 13 | 1 | 1.70 | 0.75 | 30 | 0.165 | 240 | 0.80 | 21 |
| 14 | 1 | 1.70 | 0.75 | 30 | 0.165 | 440 | 1.40 | 3 |
| C1 | C1 | 0.40 | 0.40 | 30 | 0.135 | 330 | 1.30 | 6 |
| C2 | C2 | 2.80 | 1.00 | 30 | 0.158 | 330 | 1.20 | 7 |
| C3 | C3 | 0.60 | 0.20 | 30 | 0.148 | 330 | 1.25 | 7 |
| C4 | C4 | 1.00 | 1.40 | 30 | 0.162 | 330 | 1.20 | 9 |

Production and Evaluation of Developer

Difference in Glossiness 8 parts of the toner shown in Table 5 and 100 parts of the carrier shown in Table 5 are mixed to obtain an initially filled developer. Regarding the obtained developer, Table 5 shows the value of Sm-D1 (90), the value of Ra+0.3×D1 (90), and the value of Ra+0.3×D50 (150).

A developing device of a color copy machine ApeosPortIV C3370 (manufactured by FUJIFILM Business Innovation Corp.) from which a fixing device has been detached is filled with the obtained initially filled developer, a toner application amount is adjusted to 0.45 mg/cm$^2$, and an unfixed image is printed out. As a recording medium, OS-coated W paper A4 size (basis weight: 127 gsm) manufactured by FUJIFILM Business Innovation Corp. is used. The image printed out is an image having a size of 50 mm×50 mm and an image density of 100%.

A device used for evaluating fixing is prepared by detaching a fixing device from ApeosPortIV C3370 manufactured by FUJIFILM Business Innovation Corp., and modifying the machine so that nip pressure and fixing temperature can be changed. The process speed is 175 mm/sec.

Under these conditions, the unfixed image is fixed under two conditions, a low-temperature and low-pressure condition (specifically, a fixing device temperature of 120° and a nip pressure of 1.6 kgf/cm$^2$) and a high-temperature and high-pressure condition (specifically, a fixing device temperature of 180° and a nip pressure of 6.0 kgf/cm$^2$), thereby obtaining a fixed image. Using a gloss meter, micro-TRI-gloss manufactured by BYK, the glossiness of the portion of the fixed image is measured by 60° gloss, and a difference in glossiness between the fixed image fixed under the low-temperature and low-pressure condition and the fixed image fixed under the high-temperature and high-pressure condition (that is, a difference in glossiness conditions) is determined. The results are shown in Table 5.

In a case where the difference in glossiness is less than 5, it is difficult to visually recognize the difference in glossiness; in a case where the difference in glossiness is 5 or more and less than 10, the difference in glossiness can be visually recognized, but is minor; in a case where the difference in glossiness is 10 or more and less than 15, the difference in glossiness is observed, but is within the acceptable range; and in a case where the difference in glossiness is 15 or more, the difference in glossiness is large and out of the acceptable range.

Fog 300 parts of the toner shown in Table 5 and 60 parts of the carrier shown in Table 5 are mixed to obtain a replenishing developer. Regarding the obtained developer, the value of Sm−D1 (90), the value of Ra+0.3×D1 (90), and the value of Ra+0.3×D50 (150) are as shown in Table 5.

A developer cartridge for an image forming apparatus (DC VII C7773) is filled with the obtained replenishing developer. The developer cartridge is stored in an individual packaging box according to the product, and left to stanδ for 1 month under the conditions of 30° C. and 95% RH with the developer output port facing down. Thereafter, as a tapping step, drop of the developer cartridge by weight from a height of 5 cm is repeated 100 times.

In an environment of 28° C. and 98% RH, the developer cartridge after the tapping step is installed in the image forming apparatus (DC VII C7773), and 100 sheets of A4 size solid images are printed on a paper as a recording medium. Thereafter, one blank paper (that is, an image having an image density of 0%) is printed, the state of toner fog on the blank paper is confirmed, and the evaluation is performed according to the following standard. The results are shown in Table 5.

G1: as a result of observation with a 25× magnifying glass, no toner fog is confirmed.

G2: as a result of observation with a 25× magnifying glass, several toners are confirmed.

G3: as a result of observation with a 25× magnifying glass, faint toner fog is confirmed.

G4: as a result of visual observation, faint toner fog is confirmed.

G5: as a result of visual observation, toner fog is confirmed.

TABLE 5

| | | | | | | Evaluation | |
|---|---|---|---|---|---|---|---|
| | Toner Type | Carrier Type | Sm − D1 (90) | Ra + 0.3 × D1 (90) | Ra + 0.3 × D50 (150) | Difference in glossiness | Fog |
| Example 1 | 1 | 1 | 0.49 | 1.11 | 1.21 | 4.8 | G1 |
| Example 2 | 2 | 2 | 0.05 | 1.11 | 1.18 | 7.5 | G2 |
| Example 3 | 2 | 3 | 1.05 | 1.51 | 1.58 | 7.5 | G3 |
| Example 4 | 5 | 4 | 0.05 | 0.77 | 1.06 | 8.1 | G3 |
| Example 5 | 5 | 5 | 1.05 | 1.07 | 1.36 | 8.1 | G4 |
| Example 6 | 5 | 6 | 1.15 | 1.04 | 1.33 | 8.1 | G3 |
| Example 7 | 5 | 7 | 1.25 | 1.34 | 1.63 | 8.1 | G4 |
| Example 8 | 2 | 8 | 0.95 | 0.82 | 1.11 | 7.5 | G3 |
| Example 9 | 2 | 9 | 0.35 | 1.34 | 1.41 | 7.5 | G3 |
| Example 10 | 3 | 6 | 0.35 | 1.28 | 1.35 | 11.1 | G2 |
| Example 11 | 3 | 10 | 0.33 | 1.34 | 1.46 | 11.1 | G3 |
| Example 12 | 4 | 11 | 0.03 | 1.12 | 1.24 | 12.1 | G2 |
| Example 13 | 4 | 12 | 0.48 | 1.18 | 1.35 | 12.1 | G2 |
| Example 14 | 1 | 13 | 0.48 | 1.12 | 1.29 | 4.8 | G2 |
| Example 15 | 1 | 14 | 0.49 | 1.11 | 1.21 | 4.8 | G2 |
| Example 16 | 6 | 1 | 0.49 | 1.11 | 1.21 | 10.8 | G1 |
| Comparative Example 1 | 1 | C1 | −0.91 | 0.79 | 0.98 | 4.8 | G5 |
| Comparative Example 2 | 1 | C2 | 1.59 | 1.36 | 1.46 | 4.8 | G5 |
| Comparative Example 3 | 1 | C3 | −0.61 | 0.56 | 0.66 | 4.8 | G5 |
| Comparative Example 4 | 1 | C4 | −0.21 | 1.76 | 1.86 | 4.8 | G5 |
| Comparative Example 5 | C1 | 1 | 0.52 | 1.10 | 1.43 | 23.9 | G3 |

From the above-described results, it is found that, with the developer according to the present example, a difference in glossiness between a fixed image under a low-temperature and low-pressure condition and a fixed image under a high-temperature and high-pressure condition is small, and fog of an image is suppressed.

The present exemplary embodiment includes the following aspects.

(((1)))

An electrostatic charge image developer comprising:

a toner including toner particles that contain a binder resin; and a carrier including magnetic particles and a resin layer that adheres to a surface of the magnetic particles, wherein, in a dynamic viscoelasticity measurement of the toner, in a case where a loss tangent tanδ at a temperature of 90° C. and a strain of 1% is represented by D1 (90), a loss tangent tanδ at a temperature of 90° C. and a strain of 50% is represented by D50 (90), a loss tangent tanδ at a temperature of 150° C. and a strain of 1% is represented by D1 (150), and a loss tangent tanδ at a temperature of 150° C. and a strain of 50% is represented by D50 (150), each of D1 (90), D50 (90), D1 (150), and D50 (150) is 0.5 or more and 2.5 or less, a value of D50 (150)−D1 (150) is less than 1.5, and a value of D50 (90)−D1 (90) is less than 1.0, and in the surface of the magnetic particles, an average unevenness interval Sm and an arithmetic mean roughness Ra satisfy 0.5 μm≤ Sm≤2.5 μm and 0.3 μm≤Ra≤1.2 μm.

(((2)))

The electrostatic charge image developer according to (((1))), wherein a relationship between D1 (90) and the average unevenness interval Sm satisfies the following expression (1), $$D1(90) \le Sm \le D1(90)+1.1 \quad \text{the expression (1):}$$

(((3)))

The electrostatic charge image developer according to (((1))) or (((2))), wherein a relationship between D1 (90) and the arithmetic mean roughness Ra satisfies the following expression (2), $$1.05-0.3\times D1(90) \le Ra \le 1.36-0.3\times D1(90) \quad \text{the expression (2):}$$

(((4)))

The electrostatic charge image developer according to (((3))), wherein a relationship between D50 (150) and the arithmetic mean roughness Ra satisfies the following expression (3), $$1.05-0.3\times D50(150) \le Ra \le 1.36-0.3\times D50(150) \quad \text{the expression (3):}$$

(((5)))

The electrostatic charge image developer according to any one of (((1))) to (((4))), wherein an exposed area ratio of the magnetic particles on a surface of the carrier is 4% or more and 20% or less.

(((6)))

The electrostatic charge image developer according to any one of (((1))) to (((5))), wherein the toner particles further contain resin particles.

(((7)))

The electrostatic charge image developer according to (((6))), wherein the resin particles are crosslinked resin particles.

(((8)))

The electrostatic charge image developer according to (((7))), wherein the crosslinked resin particles are styrene (meth) acrylic resin particles.

(((9)))

The electrostatic charge image developer according to any one of (((1))) to (((8))), wherein a number-average molecular weight of tetrahydrofuran-soluble components in the toner particles is 5,000 or more and 15,000 or less.

(((10)))

A developer cartridge comprising:

a container that contains the electrostatic charge image developer according to any one of (((1))) to (((9))) as a replenishing developer, wherein the developer cartridge is attachable to and detachable from an image forming apparatus.

(((11)))

A process cartridge apparatus comprising:

the developer cartridge according to (((10))); and a developing device that contains the electrostatic charge image developer including a replenishing developer replenished from the developer cartridge, and develops an electrostatic charge image formed on a surface of an image holder as a toner image by using the electrostatic charge image developer, wherein the process cartridge is attachable to and detachable from an image forming apparatus.

(((12)))

An image forming apparatus comprising:

the developer cartridge according to (((10)));

an image holder;

a charging device that charges a surface of the image holder;

an electrostatic charge image forming device that forms an electrostatic charge image on the charged surface of the image holder;

a developing device that contains the electrostatic charge image developer including a replenishing developer replenished from the developer cartridge, and develops an electrostatic charge image formed on a surface of the image holder as a toner image by using the electrostatic charge image developer;

a transfer device that transfers the toner image formed on the surface of the image holder to a surface of a recording medium; and a fixing device that fixes the toner image transferred to the surface of the recording medium.

(((13)))

An image forming method comprising:

charging a surface of an image holder;

forming an electrostatic charge image on the charged surface of the image holder;

developing an electrostatic charge image formed on a surface of the image holder as a toner image by using the electrostatic charge image developer including a replenishing developer replenished from the developer cartridge according to (((10)));

transferring the toner image formed on the surface of the image holder to a surface of a recording medium; and fixing the toner image transferred to the surface of the recording medium.

(((14)))

A process cartridge comprising:

a developing device that contains the electrostatic charge image developer according to any one of (((1))) to (((9))) and develops an electrostatic charge image formed on a surface of an image holder as a toner image by using the electrostatic charge image developer, wherein the process cartridge is attachable to and detachable from an image forming apparatus.

(((15)))

An image forming apparatus comprising:

an image holder;

a charging device that charges a surface of the image holder;

an electrostatic charge image forming device that forms an electrostatic charge image on the charged surface of the image holder;

a developing device that contains the electrostatic charge image developer according to any one of (((1))) to (((9))) and develops an electrostatic charge image formed on the surface of the image holder as a toner image by using the electrostatic charge image developer;

a transfer device that transfers the toner image formed on the surface of the image holder to a surface of a recording medium; and a fixing device that fixes the toner image transferred to the surface of the recording medium.

(((16)))

An image forming method comprising:

charging a surface of an image holder;

forming an electrostatic charge image on the charged surface of the image holder;

developing an electrostatic charge image formed on the surface of the image holder as a toner image by using the electrostatic charge image developer according to any one of (((1))) to (((9)));

transferring the toner image formed on the surface of the image holder to a surface of a recording medium; and fixing the toner image transferred to the surface of the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrostatic charge image developer comprising:

a toner including toner particles that contain a binder resin; and a carrier including magnetic particles and a resin layer that adheres to a surface of the magnetic particles, wherein, the binder resin contains a crystalline resin and an amorphous resin, the toner particles have a storage elastic modulus G' of $1\times10^8$ Pa or greater in the temperature range of 30 to 50° C., and in a dynamic viscoelasticity measurement of the toner, in a case where a loss tangent tanδ at a temperature of 90° C. and a strain of 1% is represented by D1 (90), a loss tangent tanδ at a temperature of 90° C. and a strain of 50% is represented by D50 (90), a loss tangent tanδ at a temperature of 150° C. and a strain of 1% is represented by D1 (150), and a loss tangent tanδ at a temperature of 150° C. and a strain of 50% is represented by D50 (150), each of D1 (90), D50 (90), D1 (150), and D50 (150) is 0.5 or more and 2.5 or less, a value of D50 (150)−D1 (150) is less than 1.5, and a value of D50 (90)−D1 (90) is less than 1.0, and in the surface of the magnetic particles, an average unevenness interval Sm and an arithmetic mean roughness Ra satisfy 0.5 μm≤Sm≤2.5 μm and 0.3 μm≤Ra≤1.2 μm.

2. The electrostatic charge image developer according to claim 1, wherein a relationship between D1 (90) and the average unevenness interval Sm satisfies the following expression (1), $$D1(90)\leq Sm\leq D1(90)+1.1 \quad \text{the expression (1):}$$

3. The electrostatic charge image developer according to claim 1, wherein a relationship between D1 (90) and the arithmetic mean roughness Ra satisfies the following expression (2), $$1.05-0.3\times D1(90)\leq Ra\leq 1.36-0.3\times D1(90) \quad \text{the expression (2):}$$

4. The electrostatic charge image developer according to claim 3, wherein a relationship between D50 (150) and the arithmetic mean roughness Ra satisfies the following expression (3), $$1.05-0.3\times D50(150)\leq Ra\leq 1.36-0.3\times D50(150) \quad \text{the expression (3):}$$

5. The electrostatic charge image developer according to claim 1, wherein an exposed area ratio of the magnetic particles on a surface of the carrier is 4% or more and 20% or less.

6. The electrostatic charge image developer according to claim 1, wherein the toner particles further contain resin particles.

7. The electrostatic charge image developer according to claim 6, wherein the resin particles are crosslinked resin particles.

8. The electrostatic charge image developer according to claim 7, wherein the crosslinked resin particles are styrene (meth) acrylic resin particles.

9. The electrostatic charge image developer according to claim 1, wherein a number-average molecular weight of tetrahydrofuran-soluble components in the toner particles is 5,000 or more and 15,000 or less.

10. A developer cartridge comprising:

a container that contains the electrostatic charge image developer according to claim 1 as a replenishing developer, wherein the developer cartridge is attachable to and detachable from an image forming apparatus.

11. A developer cartridge comprising:

a container that contains the electrostatic charge image developer according to claim 2 as a replenishing developer, wherein the developer cartridge is attachable to and detachable from an image forming apparatus.

12. A developer cartridge comprising:

a container that contains the electrostatic charge image developer according to claim 3 as a replenishing developer, wherein the developer cartridge is attachable to and detachable from an image forming apparatus.

13. A developer cartridge comprising:

a container that contains the electrostatic charge image developer according to claim 4 as a replenishing developer, wherein the developer cartridge is attachable to and detachable from an image forming apparatus.

14. A developer cartridge comprising:

a container that contains the electrostatic charge image developer according to claim 5 as a replenishing developer, wherein the developer cartridge is attachable to and detachable from an image forming apparatus.

15. A process cartridge comprising:

the developer cartridge according to claim 10; and a developing device that contains the electrostatic charge image developer including a replenishing developer replenished from the developer cartridge, and develops an electrostatic charge image formed on a surface of an image holder as a toner image by using the electrostatic charge image developer, wherein the process cartridge is attachable to and detachable from an image forming apparatus.

16. An image forming apparatus comprising:

the developer cartridge according to claim 10;

an image holder;

a charging device that charges a surface of the image holder;

an electrostatic charge image forming device that forms an electrostatic charge image on the charged surface of the image holder;

a developing device that contains the electrostatic charge image developer including a replenishing developer replenished from the developer cartridge, and develops an electrostatic charge image formed on a surface of the image holder as a toner image by using the electrostatic charge image developer;

a transfer device that transfers the toner image formed on the surface of the image holder to a surface of a recording medium; and a fixing device that fixes the toner image transferred to the surface of the recording medium.

17. An image forming method comprising:

charging a surface of an image holder;

forming an electrostatic charge image on the charged surface of the image holder;

developing an electrostatic charge image formed on a surface of the image holder as a toner image by using the electrostatic charge image developer including a replenishing developer replenished from the developer cartridge according to claim 10;

transferring the toner image formed on the surface of the image holder to a surface of a recording medium; and fixing the toner image transferred to the surface of the recording medium.

18. A process cartridge comprising:

a developing device that contains the electrostatic charge image developer according to claim 1 and develops an electrostatic charge image formed on a surface of an image holder as a toner image by using the electrostatic charge image developer, wherein the process cartridge is attachable to and detachable from an image forming apparatus.

19. An image forming apparatus comprising:

an image holder;

a charging device that charges a surface of the image holder;

an electrostatic charge image forming device that forms an electrostatic charge image on the charged surface of the image holder;

a developing device that contains the electrostatic charge image developer according to claim 1 and develops an electrostatic charge image formed on the surface of the image holder as a toner image by using the electrostatic charge image developer;

a transfer device that transfers the toner image formed on the surface of the image holder to a surface of a recording medium; and a fixing device that fixes the toner image transferred to the surface of the recording medium.

20. An image forming method comprising:

charging a surface of an image holder;

forming an electrostatic charge image on the charged surface of the image holder;

developing an electrostatic charge image formed on the surface of the image holder as a toner image by using the electrostatic charge image developer according to claim 1;

transferring the toner image formed on the surface of the image holder to a surface of a recording medium; and fixing the toner image transferred to the surface of the recording medium.

21. The electrostatic charge image developer according to claim 1, wherein the storage elastic modulus G' of the toner is $1\times10^9$ Pa or less.

22. The electrostatic charge image developer according to claim 1, wherein the toner particles further contain resin particles having a storage elastic modulus G' of $1\times10^4$ Pa or more and $1\times10^6$ Pa or less in a temperature range of 90° C. or higher and 150° C. or lower in the dynamic viscoelasticity measurement at a temperature rising rate of 2° C./min.

* * * * *